US011987974B2

(12) United States Patent
Matlin et al.

(10) Patent No.: US 11,987,974 B2
(45) Date of Patent: May 21, 2024

(54) FOLDABLE FRAME DEVICE WITH SPOOL

(71) Applicants: TaiHoon K. Matlin, Round Lake Beach, IL (US); James A. Waring, Libertyville, IL (US)

(72) Inventors: TaiHoon K. Matlin, Round Lake Beach, IL (US); James A. Waring, Libertyville, IL (US)

(*) Notice: Subject to any disclaimer, the term of this patent is extended or adjusted under 35 U.S.C. 154(b) by 365 days.

(21) Appl. No.: 17/374,782

(22) Filed: Jul. 13, 2021

(65) Prior Publication Data

US 2022/0007839 A1 Jan. 13, 2022

Related U.S. Application Data

(60) Provisional application No. 63/051,200, filed on Jul. 13, 2020.

(51) Int. Cl.
*E04H 15/40* (2006.01)
*A45C 13/04* (2006.01)
(Continued)

(52) U.S. Cl.
CPC .............. *E04B 1/343* (2013.01); *A45C 13/04* (2013.01); *A45C 13/06* (2013.01); *A45C 13/1046* (2013.01); *A47C 4/283* (2013.01); *A47C 15/006* (2013.01); *B63B 34/52* (2020.02); *B63B 34/565* (2020.02); *B66D 1/04* (2013.01);
(Continued)

(58) Field of Classification Search
CPC . E04H 15/20; E04H 15/405; E04H 2015/203; E04H 2015/206; A47G 9/062; A47C 4/283; A47C 15/006; A47C 4/54; A45C 13/04; A45C 13/06; A45C 13/1046;
(Continued)

(56) References Cited

U.S. PATENT DOCUMENTS

| 3,337,155 | A | * | 8/1967 | Binding | .................. | B60R 22/44 |
| | | | | | | 242/373 |
| 3,364,488 | A | * | 1/1968 | Perenic | .................. | H01Q 1/081 |
| | | | | | | 343/723 |

(Continued)

FOREIGN PATENT DOCUMENTS

CN 200958467Y-1 10/2007

*Primary Examiner* — Robert Canfield
(74) *Attorney, Agent, or Firm* — Chicago IP Law; Steven M. Evans

(57) ABSTRACT

A portable expandable device with a contracting mechanism which allows for many forms of recreational products and structures to be expanded, reinforced in the expanded shape, and then contracted easily to regain its portable form. The expansion means is exercised by the use of at least one of the following, resiliently extending, unfolding, inflating, as to become an expanding form which can then be easily retracted to the redeployed form. The retraction mechanism reverses the expansion process utilizing a mechanism which sequentially exerts the forces needed in the proper locations in order to ensure proper contraction. Disclosed embodiments utilized supplemental structural reinforcement of the expanded form through the use of joints, releasable interlocks, latching mechanisms, air bladders, to ensure the form is stable and usable. The objective being a stable structure with a rapid and easy deployment and a supplemental retraction means as to be easily transportable.

13 Claims, 26 Drawing Sheets

(51) Int. Cl.

| | |
|---|---|
| *A45C 13/06* | (2006.01) |
| *A45C 13/10* | (2006.01) |
| *A47C 4/28* | (2006.01) |
| *A47C 15/00* | (2006.01) |
| *B63B 34/52* | (2020.01) |
| *B63B 34/565* | (2020.01) |
| *B66D 1/04* | (2006.01) |
| *B66D 1/30* | (2006.01) |
| *B66D 1/60* | (2006.01) |
| *E04B 1/343* | (2006.01) |
| *E04H 15/20* | (2006.01) |
| *A47G 5/00* | (2006.01) |
| *A47G 5/02* | (2006.01) |
| *A47G 9/06* | (2006.01) |
| *B60J 11/08* | (2006.01) |

(52) U.S. Cl.
CPC ............... *B66D 1/30* (2013.01); *B66D 1/60* (2013.01); *E04H 15/20* (2013.01); *E04H 15/405* (2013.01); *A47G 5/00* (2013.01); *A47G 5/02* (2013.01); *A47G 9/062* (2013.01); *B60J 11/08* (2013.01); *E04H 2015/203* (2013.01); *E04H 2015/206* (2013.01)

(58) Field of Classification Search
CPC ......... B63B 34/52; B63B 34/565; B66D 1/04; B66D 1/30; B66D 1/60
See application file for complete search history.

(56) References Cited

U.S. PATENT DOCUMENTS

| | | | |
|---|---|---|---|
| 5,056,796 A | 10/1991 | Conville | |
| 5,213,147 A * | 5/1993 | Zheng | B60R 5/045 296/37.16 |
| 5,499,417 A * | 3/1996 | Wang | A47G 9/1027 177/144 |
| 5,693,398 A * | 12/1997 | Granger | A45C 3/10 428/101 |
| 5,927,793 A * | 7/1999 | McGrath, Jr. | B60J 11/00 160/370.21 |
| 6,164,314 A | 12/2000 | Saputo et al. | |
| 6,209,951 B1 | 4/2001 | Han | |
| 6,343,391 B1 * | 2/2002 | Le Gette | A47G 9/062 5/419 |
| 6,439,950 B1 | 8/2002 | Goldman et al. | |
| 6,571,410 B2 * | 6/2003 | Zheng | A47G 9/062 5/420 |
| 6,634,040 B2 * | 10/2003 | Le Gette | A47G 9/062 5/419 |
| 6,845,736 B1 * | 1/2005 | Anderson | A01K 27/004 119/796 |
| 7,252,106 B2 | 8/2007 | Conforti | |
| 7,398,612 B2 * | 7/2008 | Zheng | A63H 33/008 160/354 |
| D596,438 S * | 7/2009 | Le Gette | D6/596 |
| 7,665,164 B2 | 2/2010 | Le Gette et al. | |
| 9,756,967 B2 * | 9/2017 | Lehovetzki | A45C 13/1046 |
| 9,850,682 B2 * | 12/2017 | Lay | E04H 15/40 |
| 2002/0011017 A1 * | 1/2002 | Blaschke | A01K 77/00 43/12 |
| 2003/0014816 A1 * | 1/2003 | Le Gette | A47G 9/062 5/419 |
| 2005/0204681 A1 * | 9/2005 | Zeigler | E04B 1/3205 52/79.5 |
| 2006/0150451 A1 | 7/2006 | Spielberger et al. | |
| 2016/0235225 A1 * | 8/2016 | Lehovetzki | A47G 9/062 |
| 2021/0366317 A1 * | 11/2021 | Feng | G06F 1/1681 |

\* cited by examiner

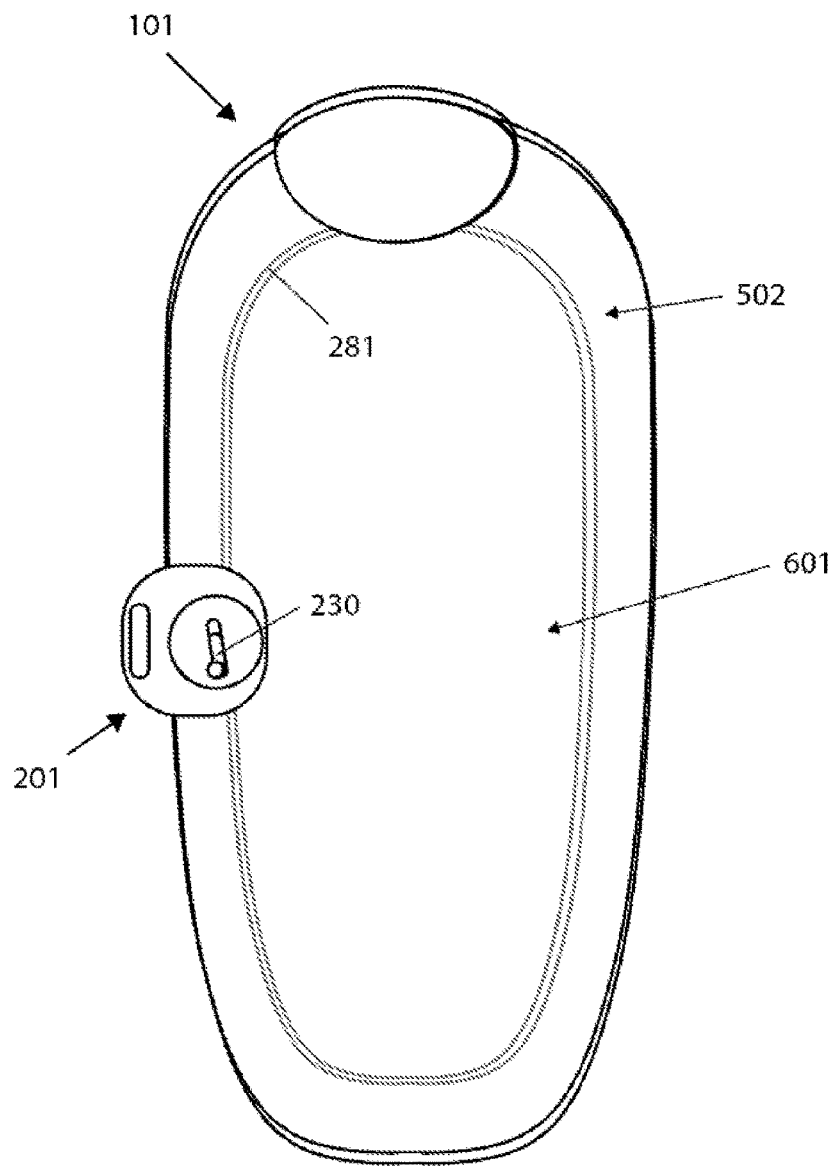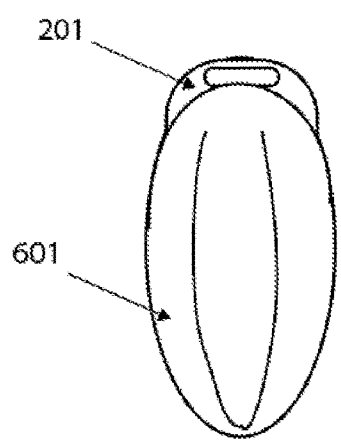
Figure 9a
Figure 9b

FOLDABLE FRAME DEVICE WITH SPOOL

CROSS-REFERENCE TO RELATED APPLICATION

This patent application claims priority to provisional patent application entitled "Modular Recreational Device with Expanding, Retracting, and Inflation Capabilities," filed on Jul. 13, 2020, having Ser. No. 63/051,200, which is hereby incorporated by reference.

BACKGROUND OF THE INVENTION

Field of the Invention

The present invention relates to portable recreational products, and more particularly, to portable foldable recreational devices.

Description of Related Art

Recreational products come in many shapes, sizes, and forms. As a growing mobile population continues to go from place to place, the use of collapsible or folding devices to aid in portability continues to grow in demand. A category of these types of transportable recreational products are foldable products which some including inflation capabilities while others have expanding frames. From simple balls, to inner tubes, beds, couches, and mattresses to some with expanding frame members like lawn chairs, hammocks and coil spring mats, to only name a few, these types of devices typically utilizes an inflatable and deflatable bladder with a manually operated valve that opens and closes, since these items generally are desired to take up as little room as possible when stored, transported, and sold. When such items are sold and then later utilized, they are pulled out of their storage box or bag, unfolded outwardly, then inflated with air by way of the air valve, manually or aided by an accessory pump device, such as a battery powered pump, or an electric vacuum operated in reverse.

There have been efforts to enlarge the air valves in these devices to reduce the inflation and deflation time, but when a device relies only on air as the supportive framework, a larger and sometimes immense amount of air is needed to ensure stability of the shape as well as usability. Due to this type of construct, ensuring all the air has been evacuated as to fold the unit to fit into the original form or box with which it had been sold in, is exceedingly difficult, if not impossible, making storage and transportability difficult. There are smaller and thinner air mattresses typically used in camping which use an inner foam layer to aid in the expanding of the shape to draw in air through the valve mechanism when the valve has been opened. These types of devices, even though easier to inflate, are difficult to deflate due to the added foam layer which needs compressing thereby limiting the use of this type of construction as a means to address the ongoing persistent difficulty in air inflation and deflation types of products.

Another mat-like inflation product utilizes a perimeter spring coil supportive frame member within the device to automatically unfold the device prior to the inflation of an air bladder within that perimeter. Once opened, the inflation step is enacted by way of hand operation to decouple the valve cover from the stem, and then inflated manually by one's breath, or by a separate inflation aid device such as a foot pump, or battery powered pump. An electric vacuum used in reverse is not likely since this particular inflatable product is a portable recreation device and the use of an electrically powered device is rarely accessible when inflation is desired. Once the person is done using the expanded and inflated device, it is desirous to retract the device back to its original minimized form. The valve is again opened, and the air is allowed to escape, accelerating the escape of the air within can be done by compression, or by way of an accessory pump device capable of operating in reverse, since rolling the device up to move the air towards the valve is not possible due to the device's perimeter spring coil frame impeding the rolling process. Again, the coil also prevents this device from being folded in the standard manner typically utilized and attempted in other types of mat-like devices, as means to accelerate the evacuating of all the air from the air bladder through the small exhaust valve. Due to the structural nature of the perimeter coil, the unit can only be re-coiled in a certain way as to not bend the perimeter coil, and if bent, the product becomes even more difficult to close, preventing it from functioning as originally intended.

It is known in the art to use a pull string mechanism to assist when folding a device with a spring coil frame member, wherein a user manually pulls a handle outwardly and extendably while holding the entrance point of the pull strings as disclosed in U.S. Pat. No. 7,127,754 titled Frame Member and Attached Membranes. When the handle has been pulled out fully and the device is closed, there is a significant amount of string exposed which one can easily become entangled so as to become a safety and choking hazard, and therefore, would most likely not pass certain toy industry safety standards. Furthermore, the pull string utilizes differing lengths of string attached to the perimeter spring steel frame along with an elastic member that traverses the pull string sections within the perimeter spring steel frame so as to ensure full retraction of the strings back into the mat device body when the device is in its fully expanded or deployed mode. In its retraction mode, the prior art does not allow for slack so when one sits or lays on the body, the strings can be felt especially when used with flexible fabric. The issue is even more pronounced since the strings with the handle ends impede the ability of the fabric to stretch past the limits set by the string length even when fully retracted into the mat's body.

Similar types of quickly deployed type products are auto windshield sunshades, photographic light diffusers, and floating recreational products utilizing the similar expanding methods that are retracted or recoiled back into the smaller configuration by twisting the coil spring by hand in a specific manner as to coil the single larger spring loop into the intended smaller multi-coiled loop for storage and transport. Due to the fabric encasement and having to fight against an expanded spring coil, and in certain products an additional internal air bladder, there is some ambiguity on how to collapse the larger spring coil into the smaller triple coil configuration needed to return the product to its pre-deployment configuration. Several attempts at this task are needed and accidental bending of the coil spring is quite a common occurrence rendering the product somewhat or totally non-functional.

One of these exemplary portable, deployable products are devices utilizing an expanding armature arrangement which have been on the market and available for many years. Such a product is a lawn chair, that when deployed from their stored orientation within a bag, once pulled out of the bag, the expansion or deployment of the frame is achieved by pulling the armature frame in an outwards direction from the center of the frame, outwards by one's hands and then the frame, the attached fabric seat and back, are fully deployed.

Typically, these types of chairs are dependent on the user extending the frame out fully, and if not accomplished, this accentuates the chair's tendency to draw inwardly as one sits upon the chair. The seat and back are typically constructed of a thin layer of fabric which provides only a minimal level of comfort. In order to retract these types of chairs, a user manually press the legs together, and then placed the retracted chair frame into a bag while continually compressing the chair frame inwards in order to reduce the diameter of the armature frame sufficiently as to fit into and within the device's storage and transportation bag. This is accomplished by working the bag up and around the chair frame several inches at a time, while repeating those compressing actions until the chair is fully encased within the bag.

Other types of recreational transportable devices such as wind screens, sunshades, and tents utilize expanding armatures and spring loops and therefore inherently have similar characteristic challenges when it comes to retracting the device to the original orientation as intended. Still other products such as lawn or beach games which are assembled on site have similar issues: set up or deployment is easier than repacking them into the original package size or orientation intended for easy transportation or storage.

Accordingly, there is a need within expandable and retractable portable products for a design that facilitates manual expansion and retraction of collapsible or foldable products especially those with a supportive frame structure.

ASPECTS AND SUMMARY OF THE INVENTION

An aspect of the present invention is to provide an aid to simplify the recoiling and closing of an expandable and retractable product, such as a device with a spring coil frame with inflation elements.

A further aspect of the present invention is to provide an aid in recoiling and closing a foldable recreational device that eliminates the significant amount of string or cord that is typically exposed when the spring coil frame is recoiled in such designs, and the string or cord can easily become entangled so as to become a safety and choking hazard.

In order to overcome these deficiencies and others, the present invention provides a foldable recreational device with a spring coil frame having a deployment and retracting recoil apparatus to facilitate the retracting process. The present invention enables a person to easily transport an inflatable or foldable product to a given location in its minimized coiled configuration, and then when needed, expand the product to the deployed position. Then, when user decides to store the foldable recreational device, the present invention overcomes the difficulty of twist folding the expanded coil spring. The easy to actuate recoiling feature utilizes a resiliently molded housing that contains a spindle assembly wherein the ends of the spring coil terminate within the housing and a reel assembly, and which when actuated, pulls in the expanded coiled spring sequentially. This inward force acts upon the coil spring as to convert the larger expanded circumference spring quickly and easily into a smaller multi coiled orientation. Several exemplary embodiments of this feature are being disclosed, one where the spindle component acts on the distal end of the two ends of the spring by reeling it in directly around the spindle component and when retracted, the fabric encasement can be simply folded, wrapped or stuffed into a carrier; optionally a pocket can be included on the fabric encasement. When inverted, the pocket then becomes a self-contained sleeve or cover for the device.

Another embodiment of the present invention provides a spindle assembly within the housing when actuated, reels in the at least one or more cables attached to the spindle and is wound around that spindle on the proximal end, and the distal end of the cable is attached to the spring coil, so when the spindle is rotated, the spindle begins to reel in at least one cable. The reeling in and around the spindle exerts an inward force by way of the cable on the expanded spring component collapsing the expanded or deployed spring into multiple smaller circumference coils. This is done while safely containing the cable within the housing so as not to create a hazardous amount of cable exposes and become entangled therewith. In the inverse, when the coil spring is expanded, the reel can spin freely as to not impeded the coil spring frame from expanding easily or if desired, be used to restrict the coil opening speed as to open in a safe and controlled manner. It is also noted, the reel stores additional length of cable even in the fully deployed state. Multiple cables, as well as differing spindle diameters, and multiple spindles in varied orientations, may be utilized within a single or multiple spindle housing assembly as to enact the forces required on the spring components in a varied sequential and non-sequential means allowing for a complex array of sequential actions to occur when implementing this feature into products that may have a multitude of varied constructs.

Illustrative of varied construct type products or devices could be those utilizing expanding armatures, such as expanding lawn chairs, hammocks, tables, shade structures, and tents to name a few, and as well as a quick expanding armature-based flotation product. These types of expanding armature products can benefit from the use of an assist mechanism utilizing an expanding spring that transforms the armature from its closed state to its expanded state and then back to its closed state. In this embodiment, and as previously disclosed, the housing containing a spindle assembly can control either or both the expanding and contracting rate of the quick opening and closing device. This is done through the use of a rotating spindle mechanism; when rotating in one direction, the cable is unspooled, allowing a torsion spring to exert a force upon the assembled armature in a controlled manner, allowing the expansion of the armature to take place. In the inverse, when rotating the spindle in the opposing direction, a contracting action is enacted by the reeling in of the cable mechanism which counters and overcomes the force of the torsion spring or springs in turn allowing the frame to contract to its closed or minimized orientation. Alternatively, the spindle assembly can be arranged as to rotate in the same direction by utilizing a trigger or switching mechanism engaging the spindle by way of a clutch when single directional rotation to activate both spooling and unspooling of the cable is needed or unrestricted spring assisted opening is desired.

These actions can be controlled by one enacting the reeling spindle action or by an automatic damper mechanism which allows the spindle to rotate in a controlled manner in either the one or two directions and variably, therefore controlling the speed in which the cable is either spooled or unspooled. This controlling method when utilized allows the expansion and contracting features to be executed safely while additionally ensuring the cable is contained within the housing and or the armatures.

Additionally, the aforementioned products can be further improved for comfort, structurally stability, and or for floatation purposes, by the addition of inflatable bladders. These inflatable bladders are utilized to increase the comfort level of the seat and back areas for chairs and loungers, set parameters with a device as to prevent ingress of varied elements such as water and or sand, and utilized as supportive ribs for sunshades and or tents, all of which also can be aided by the use thereof. Furthermore, as disclosed in this application, the air bladders can be configured as to secure these devices in the expanded state since the component when designed as disclosed and when inflated, does not allow the armature to constrict to its contracted state thereby reducing the instability typically associated with these types of devices. The mentioned inflation features when oversized as to support the expanding armature device and the person(s) utilizing the device, can be designed to float on and in the water in an intentional manner. In this floating version, the armature is to be constructed of a non-rusting material such as aluminum, fiberglass, or of a blow molded structure made of a thermal plastic or similar material.

Disclosed in this application is the use of an inflatable bladder when configured properly has unique benefits, but there also arises a tendency for the bladder's inflation and deflation actions to fight the quick deploy and quick retraction due to the nature of the inflation and deflation valve. For example, using an expanding perimeter coil spring fabric encased product, which has several versions on the market today which use an air bladder or a plurality within and is sold as a recreational floatation device has such an issue in regard to its deployment and reversing thereof. It is packaged on the shelf in a compact circular shape with pictures showing the deployed expanded shape expressing its spring open feature and its ability to float. Through research including users of these types of products, it well documented that these types of devices which are sold as quick to fully deploy, are actually only quick to open due to the spring component. After that initial expanding of the spring, the additional step of inflating the air bladder is typically slow and conducted by having to use one's own breath due to the lack of access to power, or a pump, which in actuality further delays the convenience of the initial quick expanding feature rendering the promise of the quickly deploying floating product as being unfulfilled.

Even if a portable battery powered pump is used to fill the bladder, there remains a problem with having to maintain and carry a separate device needed to quicken this step. This does not even take into consideration having to deflate all the air from this type of product prior to attempting to restore it to its original transportable configuration as well which in many instances is even more inconvenient and even more of a lengthy process as compared to the ideal which is projected by the sellers of many of these types of products. With many inflation products, but especially products with uncoiled elements such as coil springs, even after the inflation nozzle has been fully opened, one has to wait until the air has been completely exhausted out of the unit since the uncoiled component interferes with rolling up the air bladder as to accelerate exhausting all the air out of the product. This would also apply to expandable armature configurations with air bladders as well, since the armature components would impede the process needed to speed up the air exhaustion by preventing the rolling or folding the air bladder as to move the remaining air to the exhaust nozzle. Certain attempts to create controlled inflation nozzles with larger exhaust nozzles have been attempted in many configurations, but due to the large amount of air needed in many of these devices used as floatation aids, even with larger valve openings, they too continue to be restrictive as compared to the sheer volume of air within having to be exhausted out further delaying the process allowing one to fully contract the device to the original intended storage configuration.

Accordingly, the present invention provides an inflation and deflation system that can be applied to the aforementioned category of products (and beyond) to aid in not only quickly deploying the device or product, but in the inflation of and exhausting of the air within. A housing with a fan assembly removable attachable in one embodiment and also built in another embodiment, is disclosed here within. One embodiment includes within the assembly, a reduction gearing arrangement which increases the fan rotation speed when the manual crank is operated. In another embodiment a battery powered motor with or without a reduction gearing arrangement can be utilized, in another a combination of a manually operated fan for high volume and battery operated for high pressure (hybrid arrangement) and in still another, a pressurized canister can be utilized to move air into the nozzle of the air bladder once engaged or coupled to the nozzle as to be removably attached. In the ideal configuration, the air nozzle would be contained within the housing since then the nozzle then can be quite large as to allow large amounts of air to enter within the air bladder easily with very low pressure and then easily constricted as to seal the large opening quickly and effectively to restrict the now entered air from escaping. The opening and closing of such a nozzle can be controlled by a manual trigger activated by one in a natural open and closure action when adding air into the bladder by way of the high flow nozzle. Such an opening and closing actuation of the valve can be done by a finger trigger assembly which when depressed, acts to directly act upon or in a manner allowing the nozzle to its fully open state allowing air to rapidly enter into the bladder from the air pressure source, even when it is a low-pressure source due to the enlarged opening of the nozzle. When the air pressure source has been dissipated, or the source generating the pressure has been stopped momentarily or otherwise, and or when one has released the trigger, inversely closes or crimps the nozzle at single or multiple points as to create a crimped tortuous seal. This tortuous crimp seal is exceptionally reliable allowing for quick actuation, opening, and closing alternately, making it very effective for the lower air pressure high flow type of inflation. When the unit needs to be retracted to transform into the transportable or stored state, the trigger can be actuated and the device providing the air source can then be operated inversely as to pull air from the air bladder once the self-exhausting air mass portion has naturally escaped.

The self-exhausting is enhanced as compared to a more restrictive standard air valve, due to its larger nozzle opening and it being held in the fully open position as the primary means to exhaust most of the air. When a positively compressed air device is utilized such as a CO2 cartridge or other types of compressed air canister/s are utilized to inflate the air bladder, due to the lower amount of remaining air within the bladder, an inversely compressed (vacuum) canister can be utilized to create the negative pressure zone which would then evacuate the last portion of the air which remaining within the air bladder. Otherwise, an inversely operated fan blade either from the motorized or manually rotated source and or an inversely switching exhaust and inlet path or valve can be implemented if one desires to keep the operational direction of the fan in one direction when evacuating the last bit of air from the air bladder prior to the final closure action if implemented.

Further provided are means to link multiple bladders together to create additional inflatable accessories which link to the base, main or initial air bladder by way of an interlocking air nozzle. The interlocking can be achieved by a threaded, twist lock, resistive insertion and other known types of interlocking airtight connections, or any combination thereof means of removably interlocking the connections. What is not known is the use of these types of connections in a manner so the inflation of the initial air bladder will sequentially inflate the added air bladder and any additional removably attached air bladders of which the air bladder has a unique set of engagement points which supplement and reinforce the way the bladder is removably attached to the main inflation body, even when and if the air valve of the inflatable components are not interlocked. Additionally, the interlocking nozzle has a valve arrangement as to be biased in one directional (to inflate) but to also deflate quickly; this is accomplished by decoupling the secondary air bladder's connection which quickens the deflation processes of the decoupled bladders. In the alternative, when the plurality of interlinked air bladders remains interconnected, the valve would then be placed into a non-biased two-way mode as to allow the main nozzle in the base unit to be used to exhaust out the air within the secondary and plurality of interconnected air bladders. This unique arrangement independently or in combination with attachment tabs, interlacing eyelets, hook and loop tabs, and other attachment means can be added to the bladder by way of a heat-sealing method, or sewn into the bladder covering or encasement material as to ensure a secure interface with the device as to not create inadvertent disconnecting of the interlocked airway connectors. These details are used as a means for modularly adding accessories to a base unit, accessories such as inflatable cross members, headrests, armrests, backrests, sunshades, and structural elements, though the use of interconnections are added as to function in unison like the accessory had been integrated into the base device from the beginning.

Further disclosed in this application is a means to removably link one recreational device to another since much of these types of transportable products are used socially in groups, the interlinking or connecting a plurality of these devices is desirous as to keep the group intact as they interact with each other socially. As an illustrative embodiment of the feature, disclosed is an inflated floatation device with and without the expanding coil spring in which certain inflatable components whether on the base unit itself or added as an accessory at a later time, these notable features protrude beyond the perimeter of the coil spring and or the device in general. The protruding details interact with certain elements in opposing device or devices in a manner as to allow for easy interlacing of the corresponding devices protruding elements to their respective inflation profiles. This interlinking of protruding shape to the opposing unit's inflation profile, temporarily connecting them together as to easily maintain proximity and adjacency within the linked devices.

The interlocking can be conducted as to interlace two or more devices designed to interlock in a manner where the protruding shape on one device will typically overlap the inflation profile or perimeter detail on the opposing device of which are not easily displaced downward and remain interlocked due to the inflated portions keeping the interlinked sections buoyant and therefore interlocked even deeper due to the force exerted by the buoyancy. The interlocking can be reversed by simply lifting the protruding interlocking portion over and away from the opposing unit's profile elements.

In this manner, a temporarily interlocking and or interlacing arrangement of one or more units can be accomplished. Sometimes a more permanent arrangement is desired, in which case the protruding shapes interlocking nature can be supplemented by cording or locking protruding shapes and profiles together with one another use of eyelets and interlacing, snaps, or by interlocking details which have been sewn onto the device's coverings, encasements. Alternatively, or as a supplement to those details on the covering, the interlocking or interlacing shapes can be directly attached to the inflation element with the use of heat staking, adhesive, sewing and sealing, and or the use of commercial grade adhesive tapes.

Sewn covers and or encasements or optionally variable non-inflation sections of a non-covered or encased components of the aforementioned products and devices can themselves have useful details and features which allow for additional attachable accessories and for waterproof storage, waterproof power such as battery powered inductive charging for phones and tablets, of which they themselves can be encased within the recreational device, the use of general storage pockets and purposeful cavities to hold various size containers. Disclosed is the utilization of removeable and or alterable sections of the floatation device to alter the device's function, for example the floatation device's center section can be pulled back as to allow a person's feet and legs to dangle into the water allowing for leg propulsion and or egress and ingress to and from the floatation device by way interior of the perimeter.

Adding or subtracting inflated components will raise or lower one's floatation level in the water as well as adjusting the amount of air inflated within the inflatable elements. These components can be included or attached at the factory to adjust the shape of the device for differentiating price points and models as well as the fabric encasement's details such as colors, materials, and textures can be varied as well to create differing combinations. Other supplemental elements for individualizing the device for ones needs and functions and or for branding and licensing opportunities are not only graphically decorative elements but can be structural as well by the use of the inflatable bladder's shape, and by the use of a fabric encasement whether removeable or not.

The disclosed inventive features, means, methods and configurations disclosed can be individually, or in any combination thereof, be utilized as to create a multitude of embodiments of which many of have been directly disclosed and described; other aspects including none described combinations and embodiments, features, and advantages of the present invention will become apparent from the following detailed descriptions and accompanying drawings; therefore the embodiments described and illustrated herein are merely exemplary in nature and are not meant to limit the scope of the invention in any way.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed invention and specific embodiments as a basis for designing or modifying other structures for carrying out the same purposes of the present invention, and that such other structures do not depart from the spirit and scope of the invention in its broadest form.

BRIEF DESCRIPTION OF THE DRAWINGS

FIGS. 9a and 9b illustrate plan views of the alternative coil spring reel arrangement as shown in FIGS. 8a-8c, in the expanded and retracted state fully integrated into the invention;

DETAILED DESCRIPTION OF THE PREFERRED EMBODIMENTS

Figure 1:
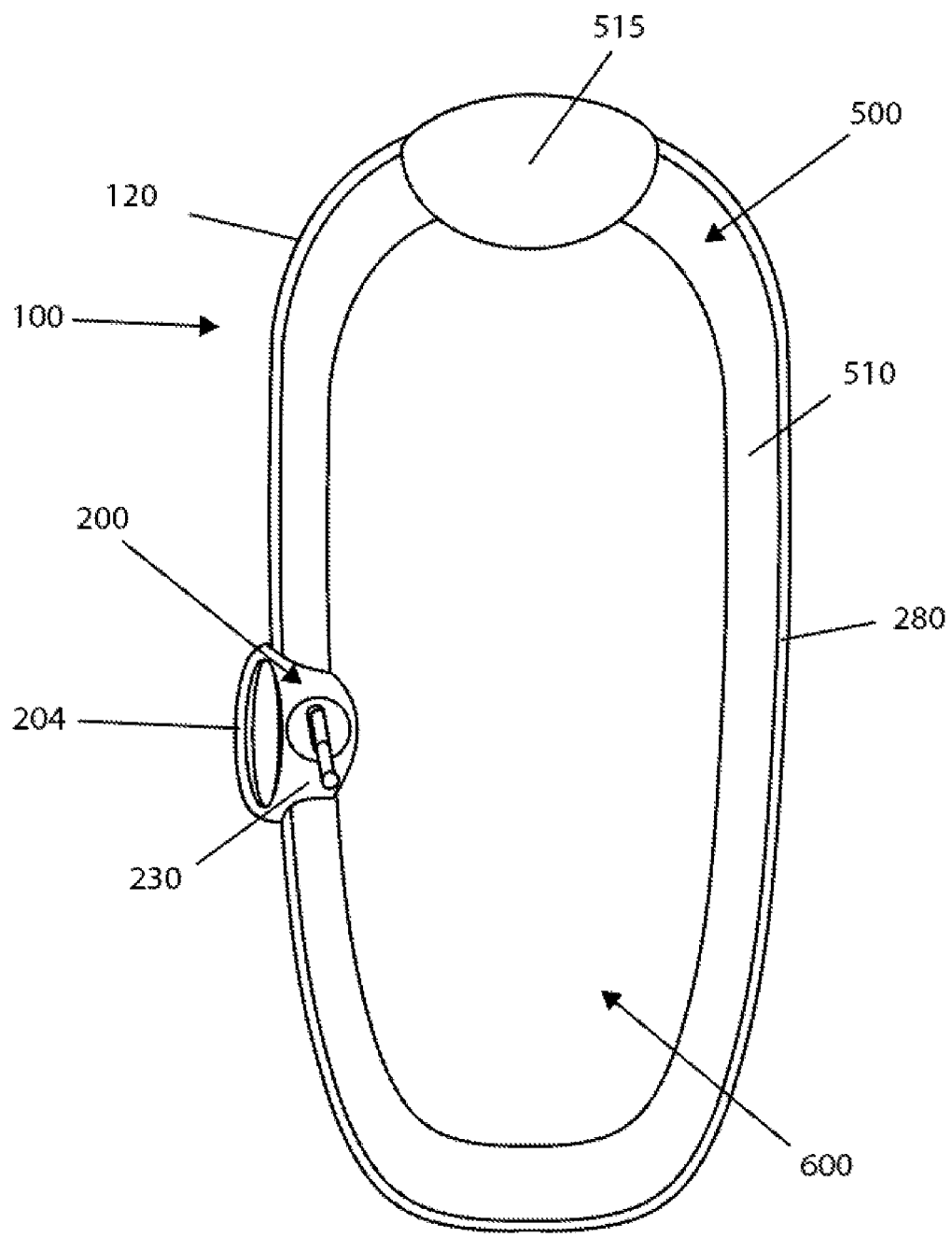
FIG. 1 is a plan view of a foldable recreational device having expanding, retracting, and inflation capabilities configured in accordance with the present invention.

Turning now to the drawings, FIG. 1 is a plan view illustrating a flexible frame device 100 with expanding, retracting, and inflation capabilities configured in accordance with present invention. The flexible frame device 100 is illustrated in its fully deployed or expanded position. A housing assembly 200 including a crank or handle 230 is included as part of the device 100. The housing assembly 200 preferably is molded from a thermal plastic material such as Styrene, ABS or Poly Propylene, or a similarly resilient material. The housing assembly 200 includes a handle 204 to carry the flexible frame device 100.

The housing assembly 200 can store several items that aid in expanding, retracting, inflation, deflation, power, storage, and mobility of the device 100. Inflation member 500 includes an expandable bladder 510 and an inflation and deflation passage that has an increasing diameter towards the center 515 where a person's neck and head would rest and can be constructed of vinyl, heat sealed and optionally flocked. A covering of fabric 600 is included and secured by sewing or sealed together material blends, preferably those that do not absorb water easily or are designed to allow air and or water to travel through them by a perforation or cut pattern in certain portions so as to easily shed water and dry quickly. The fabric covering 600 reflects the underlying shape of inflation form 500 which can be of most any shape or form. A flexible circular coil 280 extends around the perimeter 120 of the flexible frame device 100 and is covered by the cloth cover 600.

Figure 2:
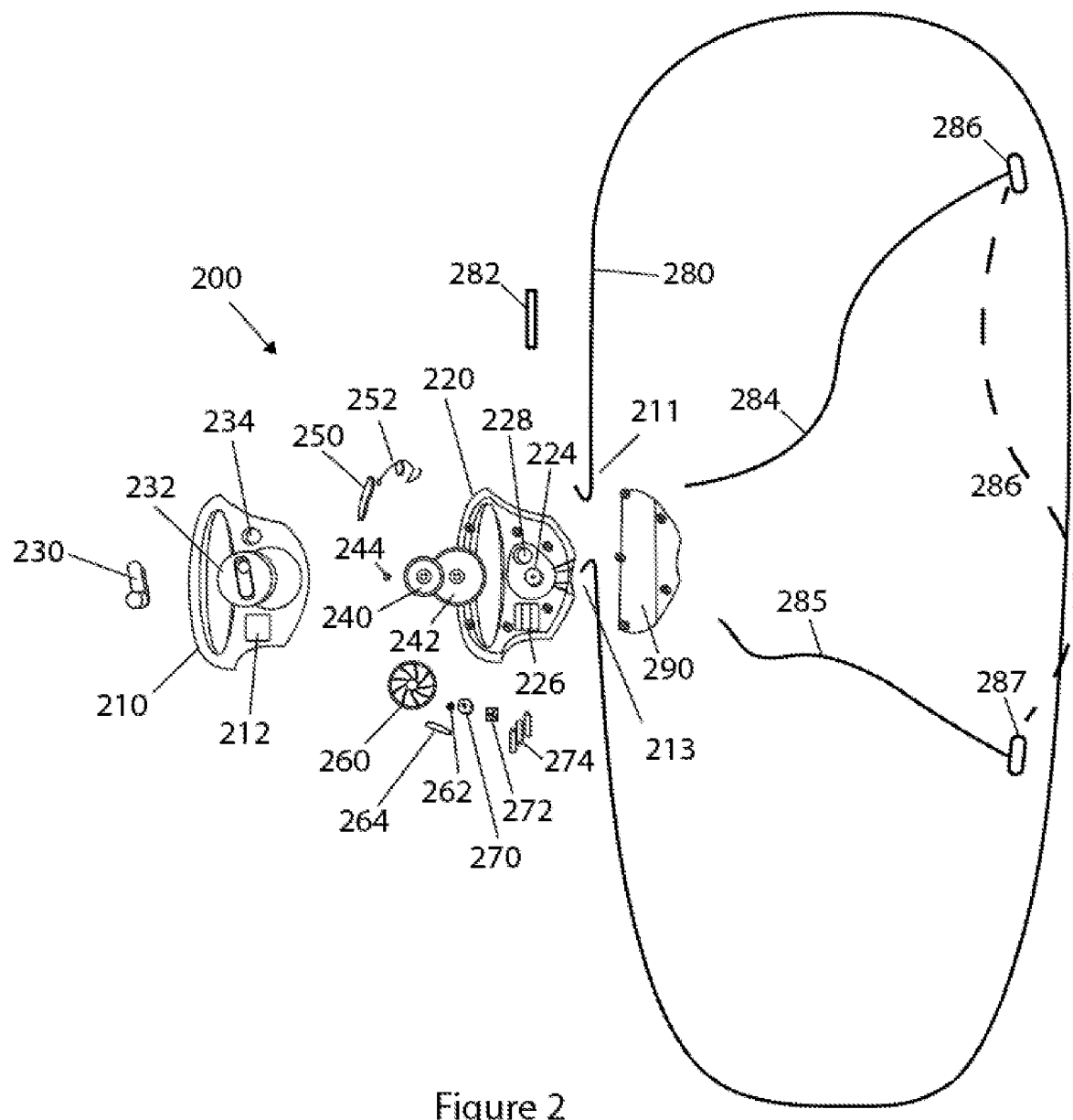
FIG. 2 is an exploded view of the housing assembly with optional features within the device of FIG. 1 and the elements contained therein.

FIG. 2 illustrates a coil spring 280 inside of the flexible frame device 100 shown in FIG. 1, and an exploded view of the housing assembly 200 and components that can be contained within the housing assembly 200. Upper housing 210 is molded from a thermoplastic material and has a latched cover 212 to access the inner portions of the assembly, this access can be used for storage, and additional features as USB power insert (not shown), and battery powered inserts such as a speaker. Access 234, when utilized, allows access to an air nozzle in inflatable units for manual or supplemental inflation to occur. Plastic rotation cap 232 has assembly points for plastic handle 230 to be attached by a metal plated axis pin (not shown) and pivoted as to recess back into the cap when not needed. The rotation handle 230 by way of plastic rotation cap 232 and square metal nickel plated assembly rod 244 to actuate small spindle or spool 240 axle diameter and large spindle or spool 242 axle diameter, which both can be made of a thermoplastic material as well on a single spindle or spool.

Spindle or spool axles 240 and 242 are of a single spool or spindle (not shown) preferably molded as one unit, or in certain applications, only as one size if the need for when two differing diameter spindle axles are not needed. The spindle or spool axles 240 and 242 are assembled together onto assembly rod 244, then seated within spindle boss or spool housing 224. The rotation of these spindle axles 240 and 242 start to draw in cable 284 and cable 285, preferably constructed of nylon (in single cable actuation, only one cable is needed). The cables 284 and 285 are attached to linear spring or flexible coil 280 which is preferably constructed from a resilient material with memory, such as fiberglass or in this case a high carbon spring steel, by way of molded plastic or metal crimp connectors 286 and 287 (in single cable actuation, only one crimp connector is need) in an alternative embodiment, a slip loop on the crimp connector can be used as to allow a single cable to function as if it were two.) The distal end 211 and the proximal end 213 of linear spring or flexible coil 280 can be formed into a return, and the return captured within the housing assembly 200.

Other more standard methods can be used to link the ends 211, 213 of linear spring 280 by using a metal crimp 282 or by over-molding both ends together by a thermoplastic over-molding process. When an optional inflation element is contained within the housing assembly 200, as it is desirous to add an inflation assistant as to eliminate the need to inflate by one's breath; plastic fan blade 260 assembled onto lower plastic housing assembly 220 by way of metal plated axis pin 262 and engages nylon gearing and or an elastomer belt 264, rotation is controlled by the operator utilizing handle 230. When rotating the handle with plastic rocker trigger 250 depressed (depressing over-rides the reeling of the spindles if the reeling feature is included into the assembly or product), the pressurized air or vacuum generated by the rotating fan exhausts into airway 228 and into the inflatable bladder by way of it's inflation valve. Forward rotation inflates and reverse rotation will deflate the entrapped inflation element. For a powered inflation and deflation, then the housing assembly would include motor 270 which by way of reduction gearing and or belt 264 drive fan 260. Actuation of forward or reverse of motor 270 is controlled by rocker trigger 250 overcoming biased spring steel arm 252 as to toggle power and signal the controller on printed circuit board assembly 272 which is powered by batteries 274 residing in holder detail to operate in either forward or reversed depending on the toggled direction of actuation trigger 250. Batteries 274 can be of the recharging type and power other mentioned accessories by way of the USB connector insert (not shown) residing within the housing by way of latch covering 212.

The blower feature can be an off-unit accessory that removably interlinks with the air passageway nozzle of the device to be inflated by way of a connector type such as a bayonet type to engage with housing opening 234, when inflation and deflation is needed versus being built into housing assembly 200. A pre-pressurized canister can be used to aid in inflation and inversely a vacuum canister can be used to aid deflation as well. A pressurized canister or vacuum canister both can be in the form of ready to actuate cartridges which would be then interface with the air passageway nozzle, and be either activated by rocker trigger 250, or the accessory devices own trigging mechanism to create an instant inflation, and or deflation feature. Furthermore, an option of rotating handle 230 along with the subsequent and successive assemblies when toggled into recharging mode, can operate the motor's rotation as to generate current to the batteries. Other recharging methods such as solar (not shown) are available to be integrated along with all or some the aforementioned components depending on the desired functions all entrapped and contained by way of assembling the upper housing 210 and the lower housing 220 together by way of plated assembly screws (not shown). When the housing assembly 200 is assembled as to create device 100, housing backer 290 is installed to ensure no sharp components and or shapes are exposed to the optional inflation element or outwardly to the operator.

Figure 3A:
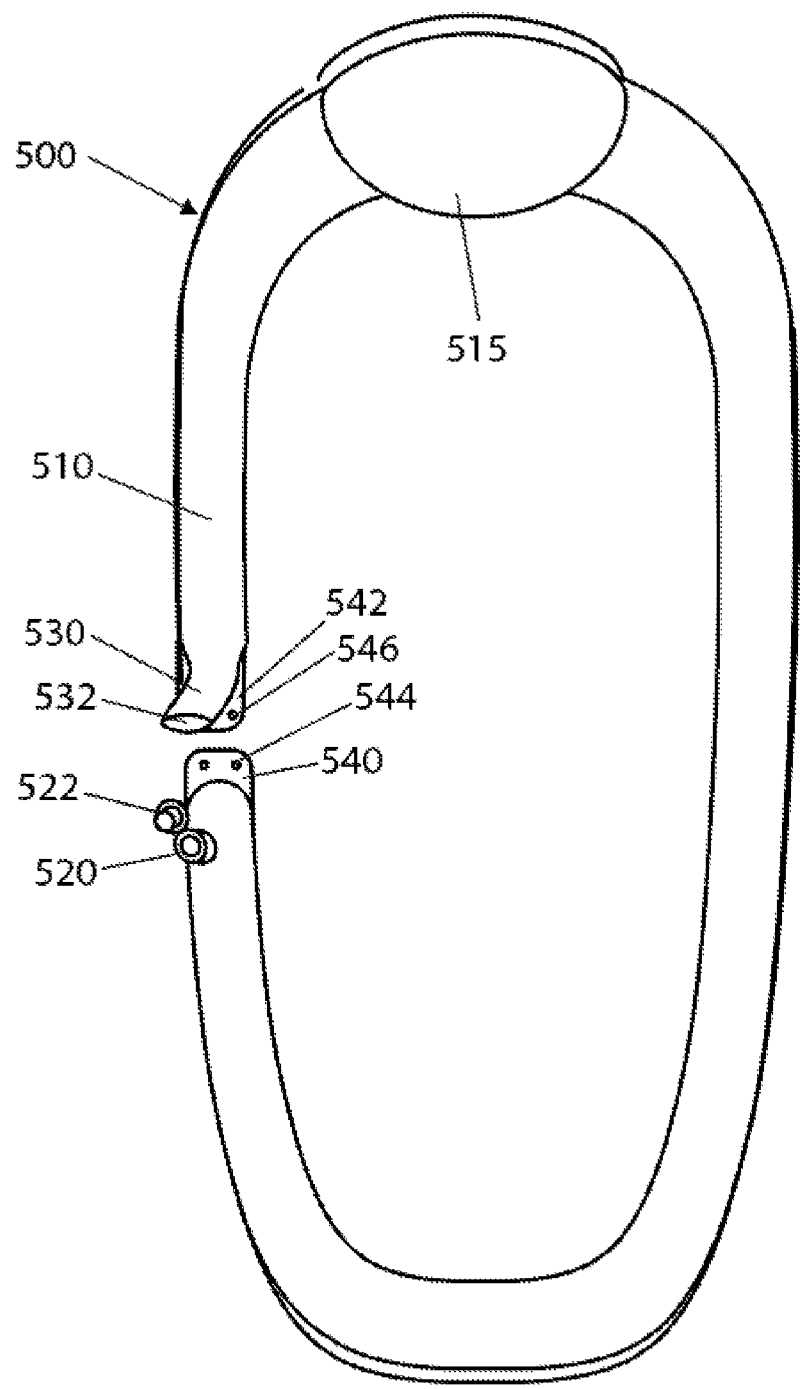
FIG. 3a is a cut-away view of the device shown in FIG. 1 wherein a high-flow inflation/defation system is illustrated.

FIG. 3a is a plan view of inflation form 500 and a side cutaway view of an air passage nozzle 530 in closed and open positions. FIG. 3a represents inflation element form 500, in this embodiment produced from a cut and heat-sealed vinyl film material with inflation bladder 510 in the form of an open loop with assembly flange 540 with assembly eyelet 544 at the distal end of the loop as to secure the bladder into housing assembly 200 (FIG. 2) by way of heat staking. Inflation bladder 510 can include optional inflation nozzle 520 with a passive flow valve within which can be defeated momentarily when an inserted element remains within the nozzle 520 along with attached cap 522. The nozzle and attached cap can be pushed in to be flush with the surface of inflation bladder 510 but can be pulled out when manual inflation and deflation means are needed, or as a way to attach other interlinked inflatable accessories as shown in FIG. 5b. In between the two ends is a larger interim headrest 515 which can be incorporated as to be part of inflation bladder 510 or can remain a separate inflatable bladder removably attached to inflation bladder 510. The proximal end of the loop has the low-pressure high flow nozzle 530 with enlarged opening 532 which allows a pathway to inflate bladder 510 with advantageous lower pressure air flow generated from a hand operated or battery powered high flow fan for quick inflation and deflation which is needed for quick deployment as previously disclosed and included within assembly 200 of FIG. 2.

Figure 3B:
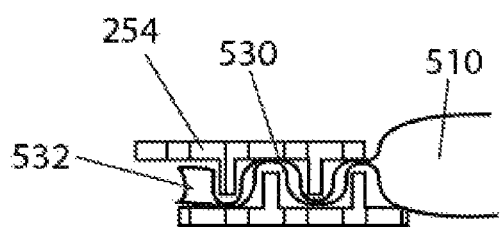
FIGS. 3b and 3c are cross-sectional views of a high flow air passage nozzle of FIG. 3a in a closed and an open position.
Figure 3C:
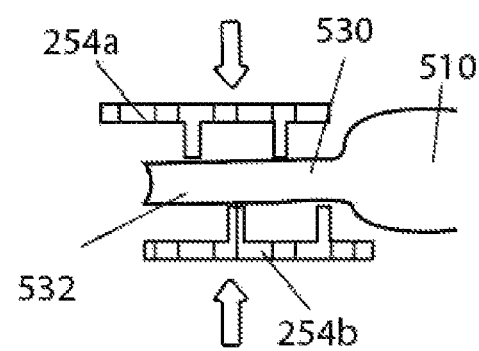

FIG. 3b represents a cross-sectional view of high flow nozzle 530 with enlarged opening 532 with members 254 in a crimped compression, and FIG. 3c represents a cross-sectional view of the high flow nozzle 530 with members 254 in an open condition. Members 254, when opened, spreads apart the upper and lower nozzle walls which in turn opens a pathway for air to enter through enlarged opening 532 to inflate bladder 510. When compression members 254 (254a upper and 254b lower) close upon high flow nozzle 530, previously entered air which has inflated bladder 510 is prevented from escaping back through the nozzle due to the tortuous crimp path creating a highly effective and reliable airtight closure. To exhaust bladder 510, inversely opening compression members 254 (a & b) let air now escape easily with even low compression on bladder 510 with little or no resistance as compared to most inflation nozzles in the market today. Alternatively, compression members 254 (a & b) could be designed as to not only crimp high flow nozzle 530, but it could also be designed to roll the nozzle over onto itself during the crimping action. As previously disclosed, inflation form assembly 500 can be optionally included as a feature and entrapped within housing assembly 200 by way of heat stake openings sets 544 and 546 which mate up with heat stake bosses within housing assembly 200 (not shown) as to align assembly 500's valve system to coincide with the inflation mechanism or manual inflation access opening 234 within the assembly's body (see FIG. 2).

Figure 4A:
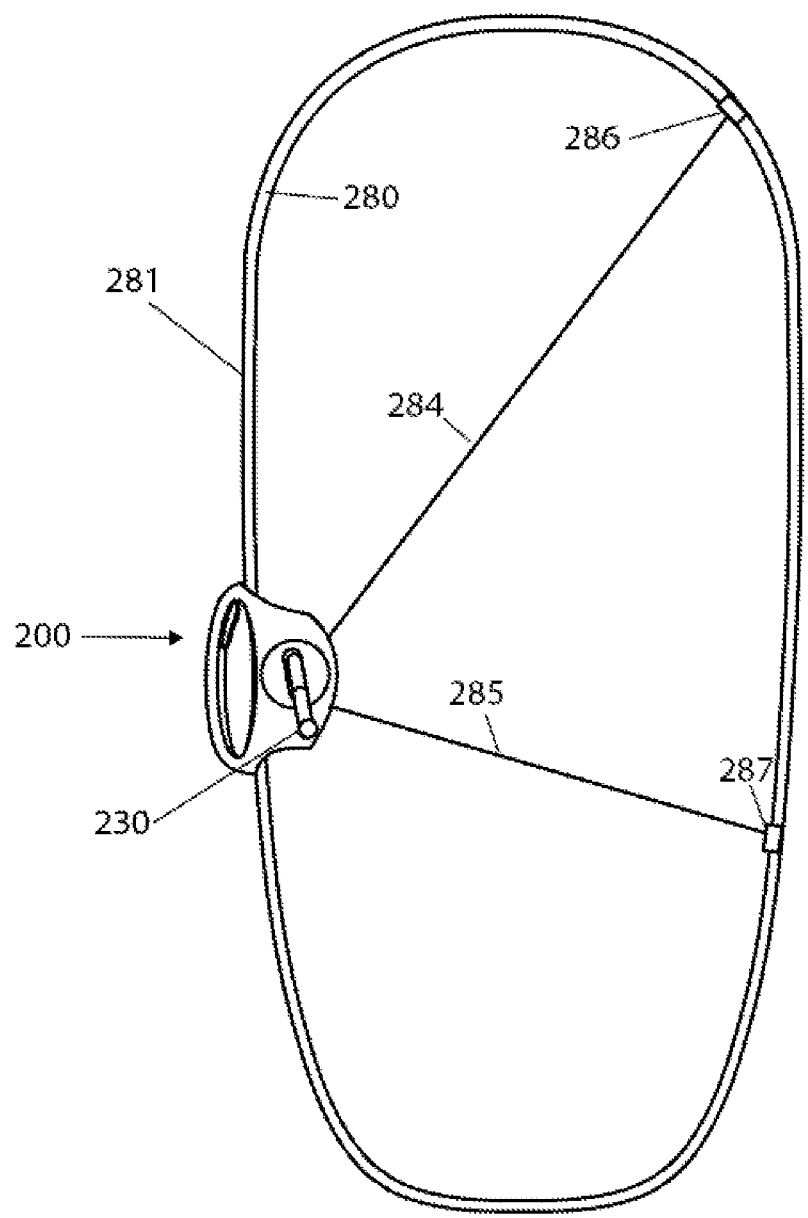
FIGS. 4a-4d are sequential views illustrating an embodiment of the device's easy close, reeling feature function in accordance with a first embodiment of the present invention.
Figure 4B:
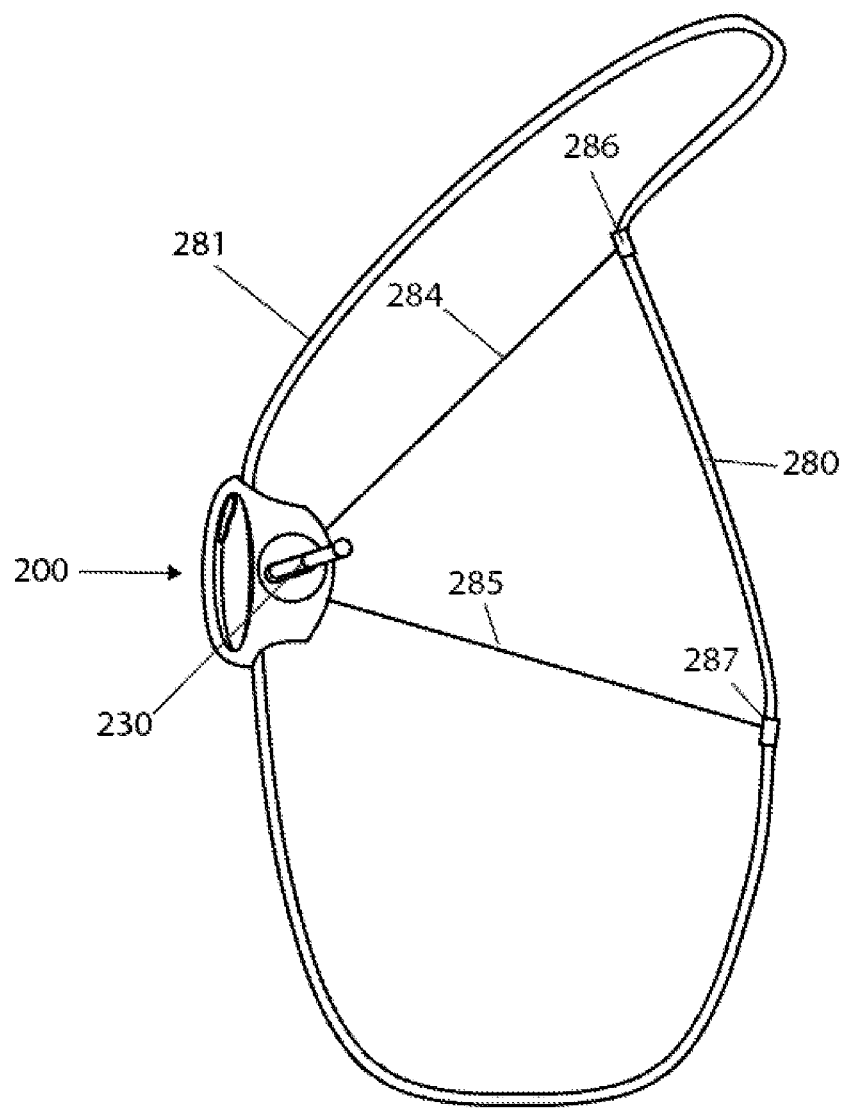

FIGS. 4a-4d illustrate a sequence of plan views representing how a preferred embodiment of the easy close, recoiling feature works. FIG. 4a shows the flexible coil spring 280 in its fully deployed large hoop shape. Illustrated are the housing assembly 200, handle 230, flexible coil 280, cords 284 and 285, and crimps 286 and 287. FIG. 4b illustrates the beginning of the closing recoiling operation. One would rotate handle 230 clockwise, which rotates internal spindle or spool axles within the housing assembly 200 which draw in cord or cables 284 and 285 (in this embodiment we are representing the actuation using two cords or cables). Due to the differing locations of the attached ends of the cables 284 and 285 on the unfolded spring or coil 280, and therefore the length of cable 284 differs from the length of cable 285, and the spool axle diameters, and optionally if needed or as an alternative to using two differing diameters, a slip clutch or pin in slot arrangement can be utilized to ensure the proper sequence (of one spool starting prior to another as a means to accommodate differing lengths of cord) and rate of cord length winding and unwinding is initiated and continues through the process.

Figure 4C:
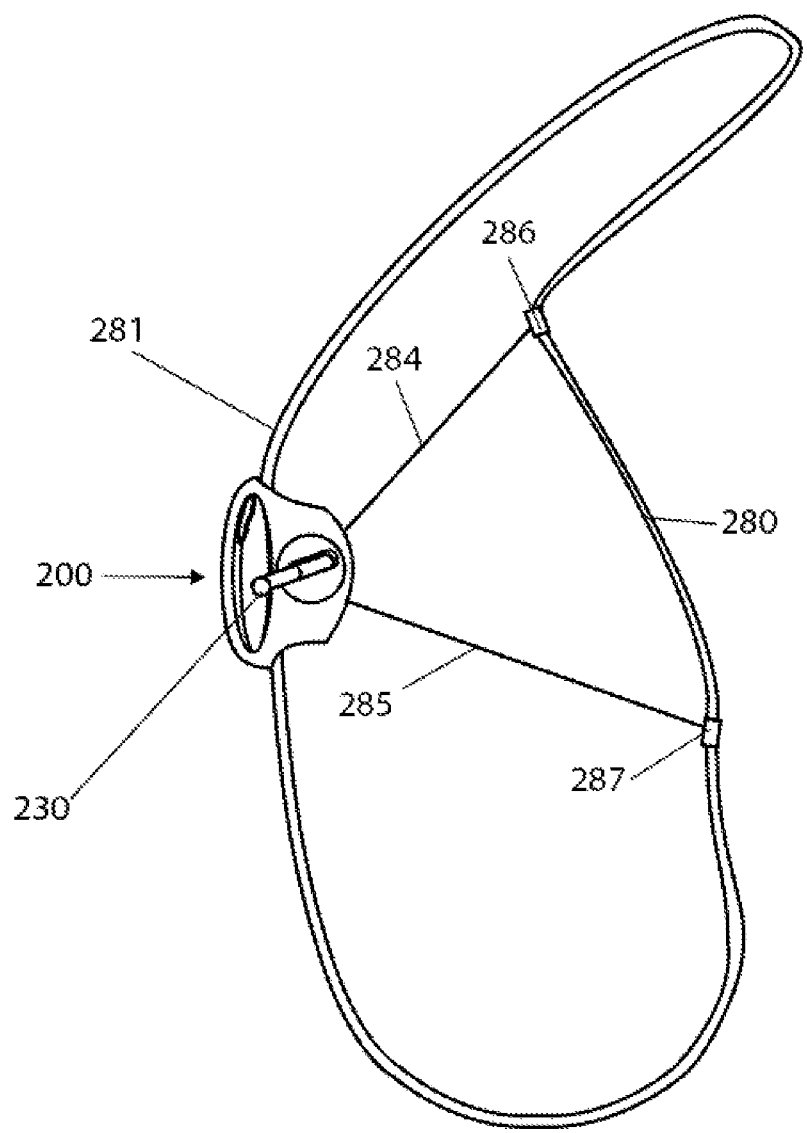
Figure 4D:
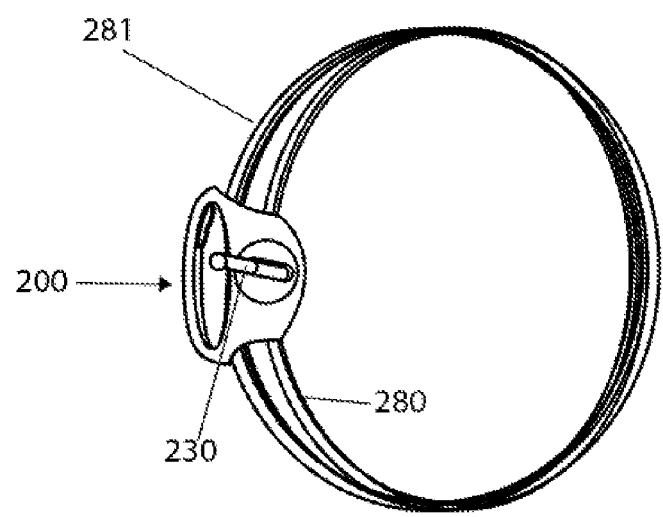

FIG. 4c illustrates the sequential continuing rotating of handle 230 and the closing or recoiling operation showing how expanded spring or coil 280 is starting to collapse, or fold in upon itself, due to the continued reeling in of the cords 284 and 285. Finally, in the sequence, FIG. 4d illustrates the results of the continued rotation of handle 230, a smaller and fully collapsed or coiled spring 280 is represented including its optional extruded plastic protective covering 281.

Figure 4E:
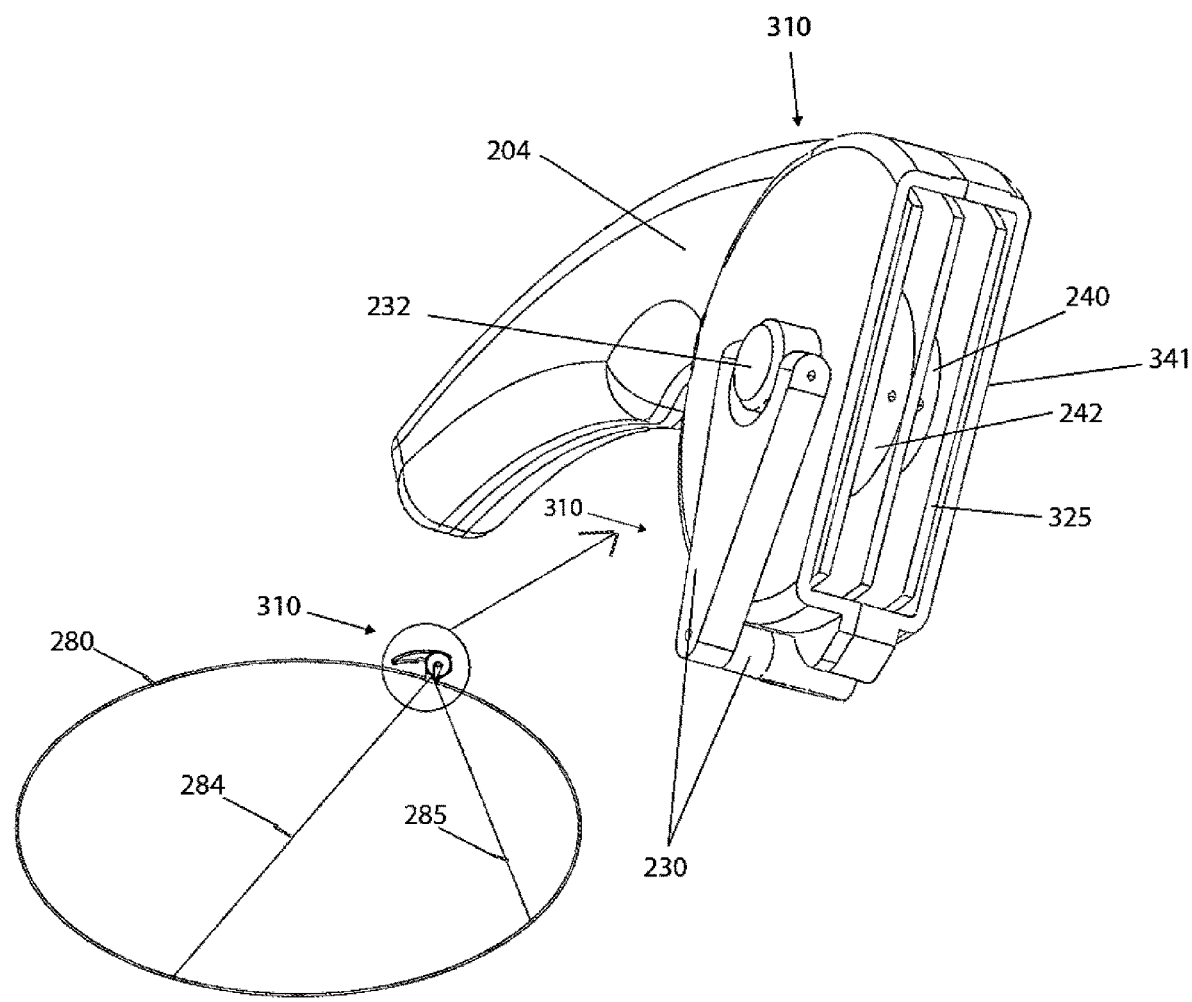
FIG. 4e is a perspective view and an enlarged view of a handle and spool apparatus configured in accordance with another embodiment of the present invention.

FIG. 4e illustrates the flexible circular coil or spring 280 and the spool housing 310. The spool housing 310 as numbered and shown can be an alternative embodiment and shape to the housing assembly 200 shown in FIG. 1. The spool housing 310 includes a spool 325 (FIG. 4g) with axle diameters 240 and 242 having smaller and larger diameters, respectively. The handle 230 is connected to the spool 325 to rotate the different axle diameters 240 and 242. The spool housing 310 preferably is constructed of molded of a thermoplastic such as ABS or high impact styrene and can be sealed or closed utilizing thermo or sonic welding or assembled by using threaded screws.

Figure 4F:
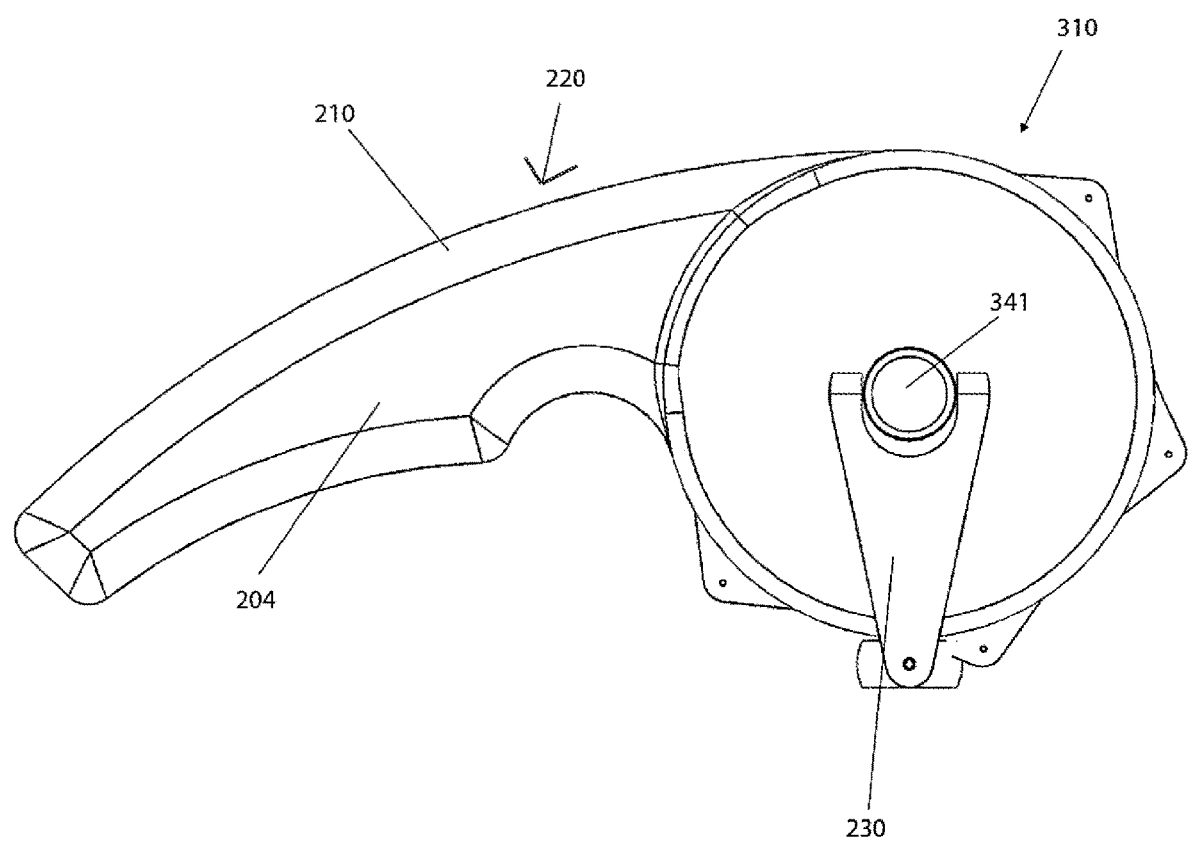
FIG. 4f is a side view of the handle and spool apparatus shown in FIG. 4e.

FIG. 4f is a side view of the spool housing 310 shown in FIG. 4e. The handle 230 is shown connected to the spool housing 310 Assembly housing handle 204 is configured as to easily hold the housing assembly while the other hand operates crank handle 230 in the operation direction needed to either open or close the expanding frame device.

Figure 4G:
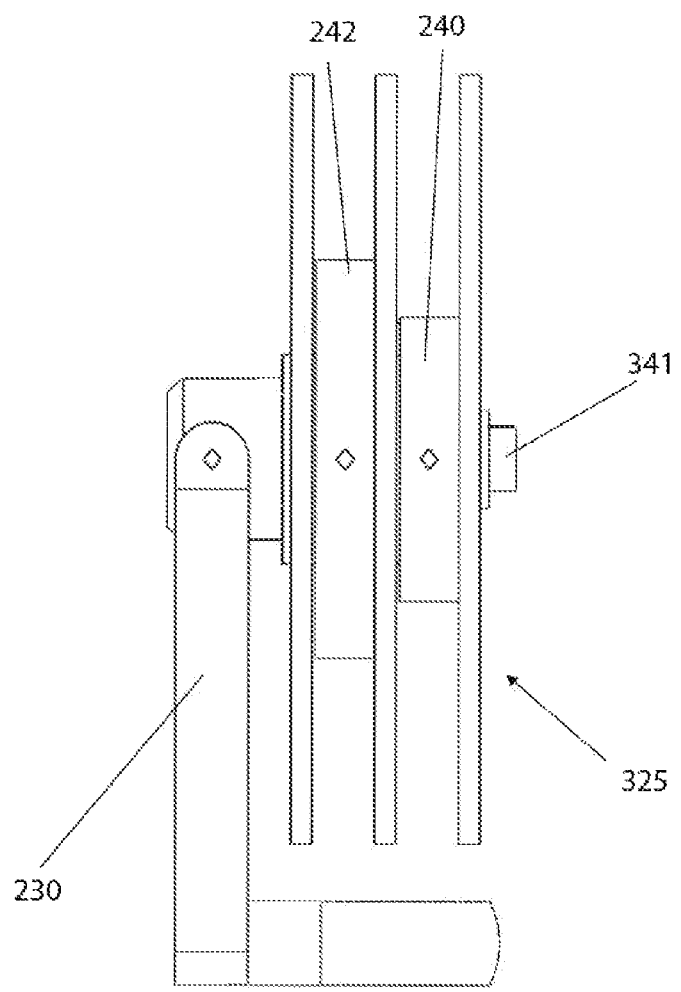
FIG. 4g is an end view of the handle and spool apparatus of FIG. 4e illustrating the multiple spool diameters in order to reel in cords at different rates.

FIG. 4g is and end view of the spool 325. Illustrated are the spool handle 230 connected to the rotation cap 232 which is connected to the axle 341 of the spool 325. Also illustrated are the smaller diameter 240 and larger diameter 242 axles of the spool 325. Handle 230 can pivot outwardly by way of the hinge pin attached to axle 341. When pivoted outwardly, handle rotation end (not numbered) spins freely to aid in the reeling action.

Figure 4H:
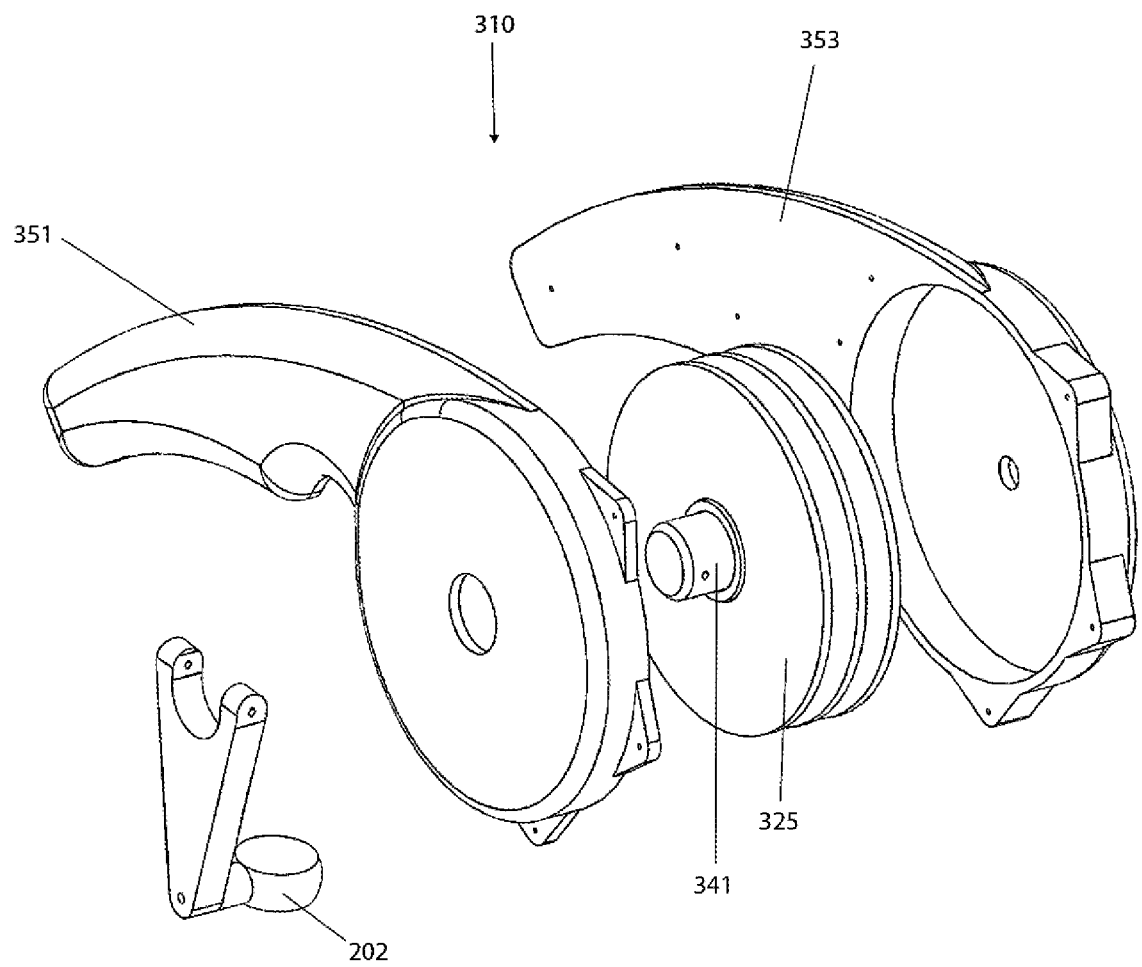
FIG. 4h is an exploded view of the handle and spool apparatus of FIG. 4g.

FIG. 4h is an exploded view of the spool housing 310. Illustrated are the spool 325 contained within a first half 351 to be connected to a second half 353 of the spool housing 310. Also illustrated is the handle 230 connected to the axle 341 of the spool 325.

Figure 4I:
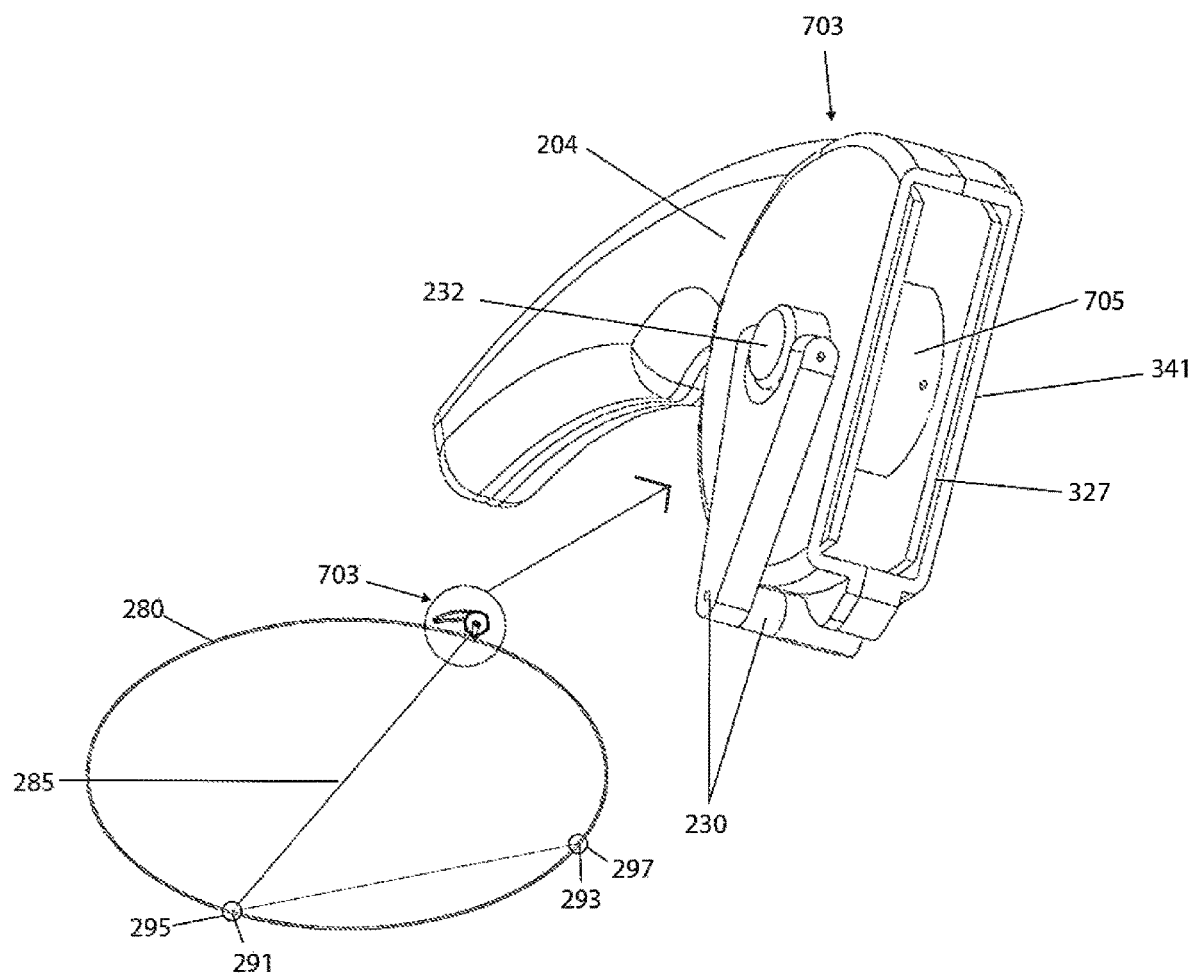
FIG. 4i is perspective view and an enlarged view of the spool apparatus configured in accordance with another embodiment of the present invention.

FIG. 4i illustrates another embodiment of the spool housing 703 which uses a spool 705 having a single diameter and a single cable actuation 286 connected at locations 291 and 293 of the flexible coil 280. A slip loop 295 at location 291 can be used as to allow a single cable or cord 286 to function as if it were two, and crimp 297 preferably connects the cord 286 to the flexible coil 280 at location 293.

Figure 5A:
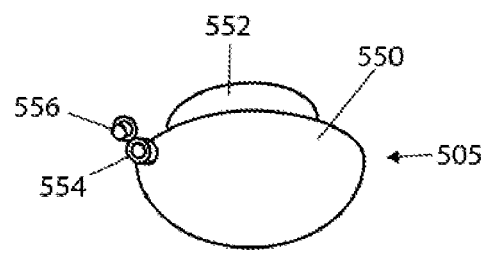
FIG. 5a-5c are sequential views representing alternative forms or shapes of interlocking inflatable bladders and valve arrangements that can be utilized within the present invention shown in FIG. 1.
Figure 5B:
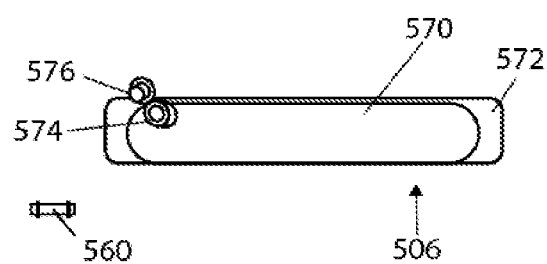
Figure 5C:
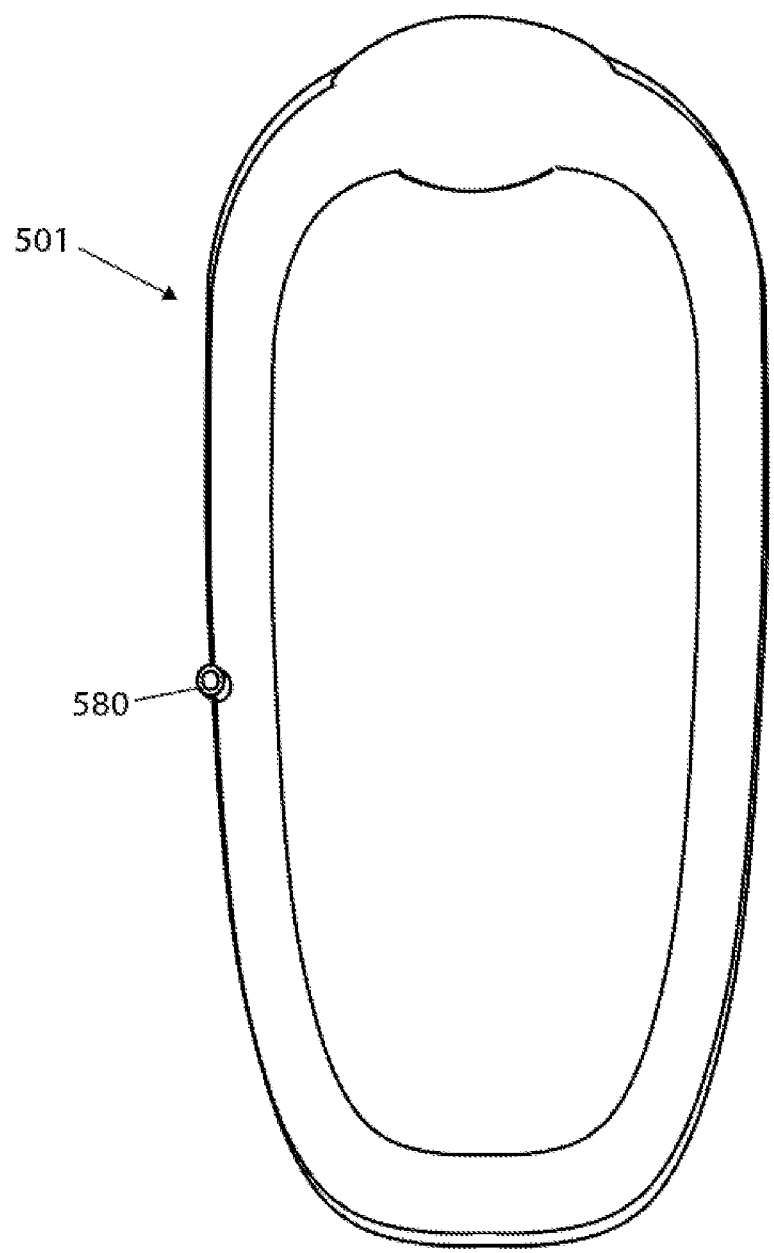

FIGS. 5a-5c is a combined illustrative front view representing alternative forms or shapes of inflatable bladders which can be utilized within the invention. FIG. 5a shows a bladder shape 505 with main bladder 550, inflation and deflation nozzle 554 with attached cap 556. Attachment flange 552 is used to secure bladder shape 505 onto the main device by securely tucking into the undercut of another additional inflated form as to add a head or footrest and can be additionally secured by way of hook and loop or other removable attachable assembly means. If sequential inflation is desired so as the action of filling the main form, typically the largest inflation bladder with air would then fill the secondary smaller bladder such as shape 505, one would insert linking nozzle 560 (various lengths are provided) into the inflation and deflation nozzle 554 and then the distal still protruding end of linking nozzle 560 into an available nozzle on the main form to complete the air flow link.

FIG. 5b is an illustration of another bladder shape 506 which forms a cross brace and or could be shaped as to be armrests as well; main bladder 570 would have attachment flanges 572 which can be additionally secured by way of hook and loop or other removable attachable assembly means. Inflation and deflation are achieved by nozzle 574 with attached cap 576 and accepts the bridging linking nozzle 560 when full integration is desired.

FIG. 5c is an illustration of a main bladder shape 501 which the additive bladder shapes such of various forms as shapes 505 and 506. This particular bladder shape 501 has the headrest shape integrated within its form, therefore shape 505 could be added as a footrest. Several nozzles exemplified by denoted nozzle 580 can be located in various locations as to ensure proximity and availability to ease the placements of the additional inflatable forms.

Figure 6:
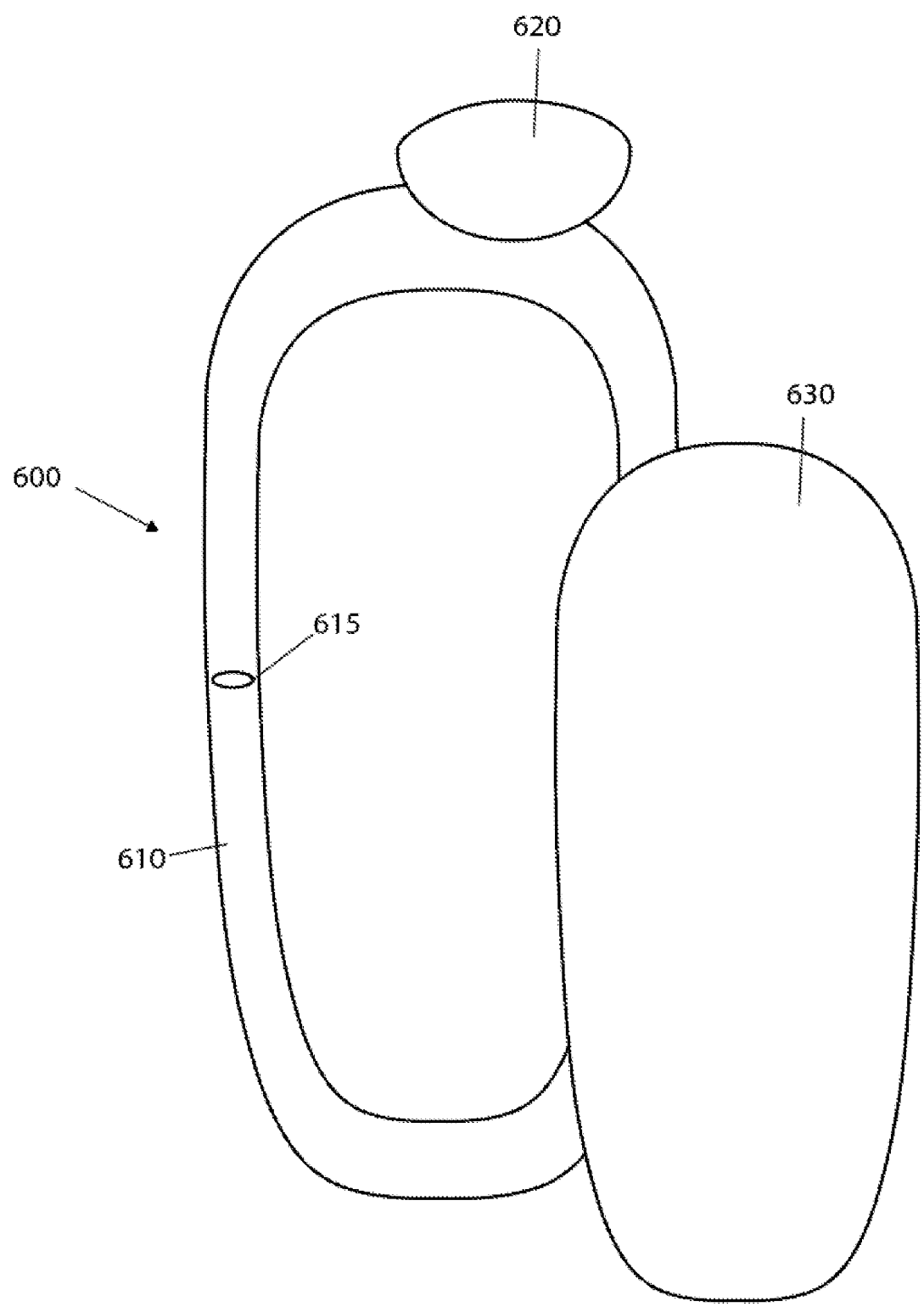
FIG. 6 is a plan view illustrating a covering of the device including various materials.

FIG. 6 is a plan view illustrating cover 600 which could be constructed of various materials from heat sealed vinyl to a sewn cover which has been patterned to encase the main inflation bladder form such as to cover 500 or 501 or other various shapes and configurations. Main bladder shape covering 610 is designed to wrap and entrap the main bladder shape and has various details such as slit 615 which can be numerous to allow protrusion of and access to the numerous nozzles attached to the bladders. Headrest shape covering 620 is designed to cover the headrest and center spanning cover 630 is designed to stretch and be sewn or sealed in such a manner as to bridge the open center of inflation shape covering 610 in its entirety of the open span or can be partially assembled as to allow the remaining non sealed or sewn section to be closed by way of a zipper or any other temporary closing means so access through the center of cover 610 can be provided. Center spanning cover 630 can be of material which is porous or to have perforations or be purposefully formed and sewn or include heat sealed openings which allow water to pass therebetween the upper facing surface and the lower water facing surface.

Figure 7A:
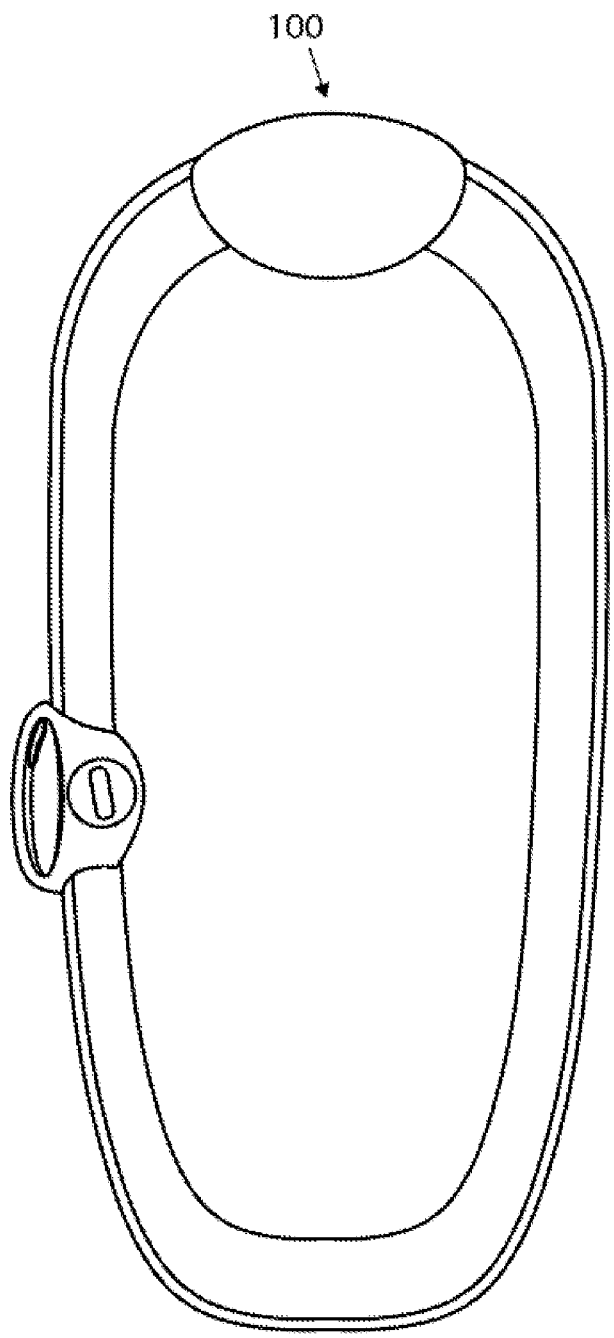
FIGS. 7a-7c are illustrate a sequence of an embodiment of the invention of FIG. 1 in deployed and retracted configurations, whereas the handle is easily configured to transport the device it both the expanded and retracted state.
Figure 7B:
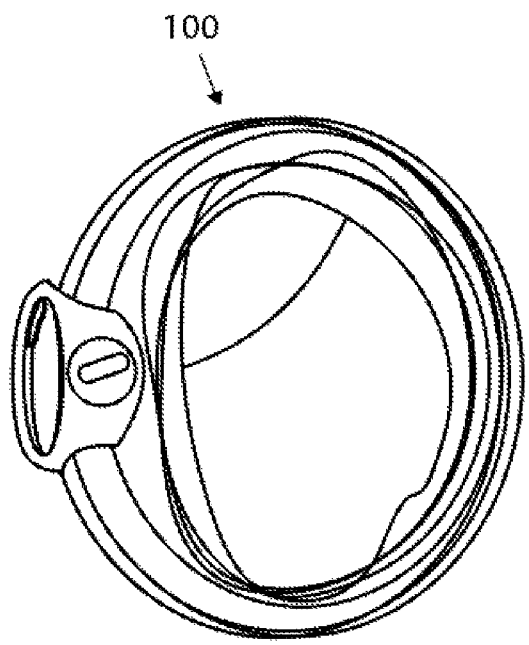
Figure 7C:
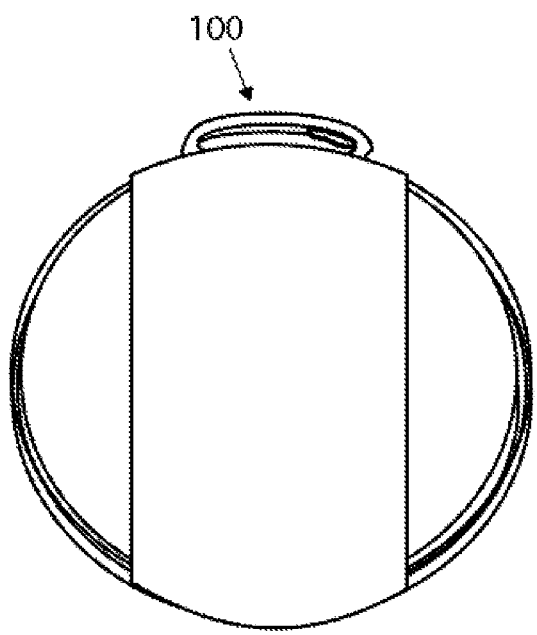

FIGS. 7a-7c are plan views illustrating device 100 in the deployed configuration as shown in FIG. 7a, the retracted configuration as shown in FIG. 7b, and on the hang tag configuration as shown in FIG. 7c, with graphical sleeve and a carrying handle in the upwards position representing a configuration in which the device could be sold on the shelf and or shipped.

Figure 8A:
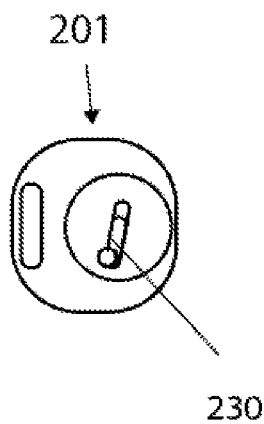
FIGS. 8a-8c illustrate a sequence of the rotating handle and spool apparatus and an alternative embodiment of retracting the coil spring into the reel body of the present invention.
Figure 8B:
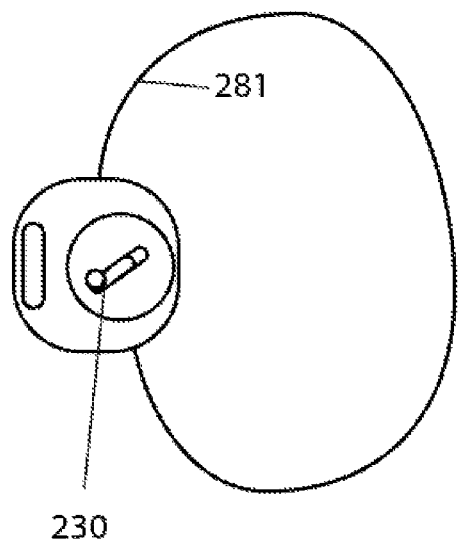
Figure 8C:
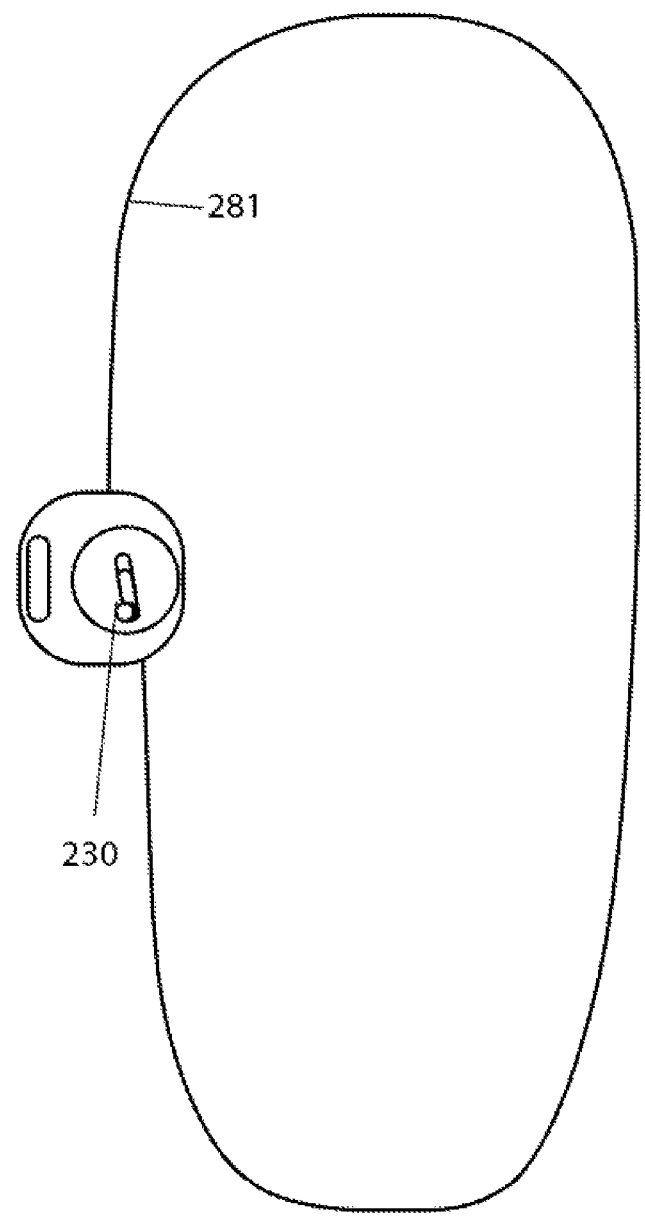

FIGS. 8a-8c are sequential plan views illustrating an alternative embodiment of a spring coiling configuration with housing 201. In FIG. 8a rotating handle 230 when rotated, unravels from its internal spool spring 280 where the distal end of the spring reeling from spool is anchored within housing 201. Due to the distal end staying in place, the remaining spring (by rotation of handle 230) starts to expand in size as shown in FIG. 8b. As the rotation of handle assembly 230 continues, FIG. 8c illustrates the springs fully deployed form. This expansion feature can be entrapped within two layers of fabric when fully implemented as to contain the spring. The deployed alternative spring form can be assembled in a manner as to actuate within the inner center opening of inflation bladder 500 or 501 or any similarly configured shape with a center opening to create a supportive and expanding spring frame.

FIGS. 9a and 9b illustrative front views of housing 201 fully integrated into the present invention as shown in embodiment 101 of the invention. Embodiment 101 is shown in its fully deployed state in FIG. 9a, with expanded coil spring 280 entrapped within center spanning cover 601. When coming to a fully deployed position, expanded coil spring 281 resides at a position just inwardly adjacent to inflatable main bladder shape 502 which has been fully inflated by the integrated fan assembly within housing assembly 201. FIG. 9b illustrates the invention in its embodiment 101 in the fully retracted state, with the coil spring wound within housing 201 of which the center spanning cover 601 with its integrated pocket has been inverted as to allow one to now stuff pack the deflated bladder shape 502 and its corresponding cover into the minimal configuration shown. This compacted shape is due to the retracted coil spring and is shown with the housing handle in the upward storage or hanging position.

Figure 10:
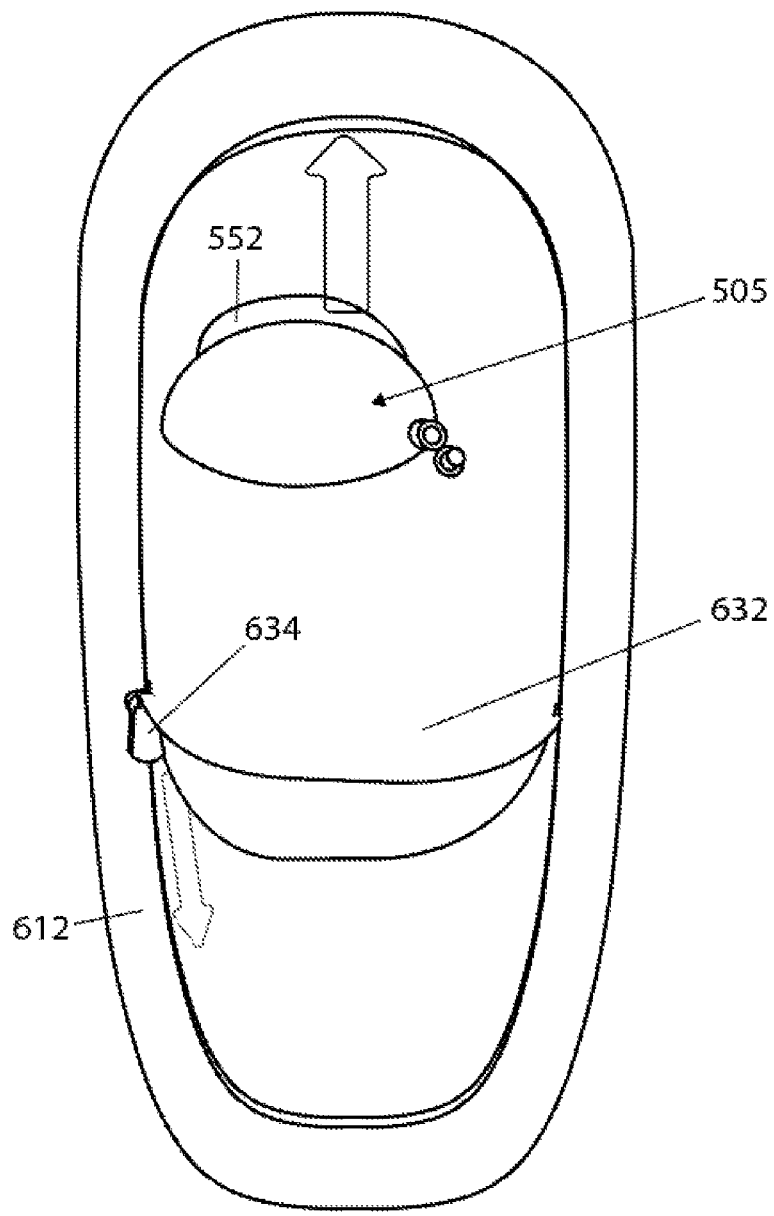
FIG. 10 is a plan view illustrating a covering for the main bladder along with the additive accessory headrest bladder shape with attachment tab.

FIG. 10 is an illustrative front view representing covering main bladder shape 612 with additive accessory headrest bladder shape 505 by way of attachment tab 552 which slides into the undercut inflated portion of shape 612 in the direction as defined by the arrow and of which the attachment can be reinforced by use of a snap button or hook and loop configuration. Portions of spanning cover 632 can be separated from main inflation shape cover 612 by way of zipper 634 shown (hook and loop or an alternative opening and closing means could be used in place of zipper 634), in the open position which allows one's legs to fold downward to access the water of which the device is floating upon for propulsion and movement control; this opening would also allow one to ingress and digress from the device as well. To close, one pulls zipper 634 towards the direction defined by the arrow until spanning cover 632 is fully engaged with inflation shape cover 612 as to close the opening.

Figure 11:
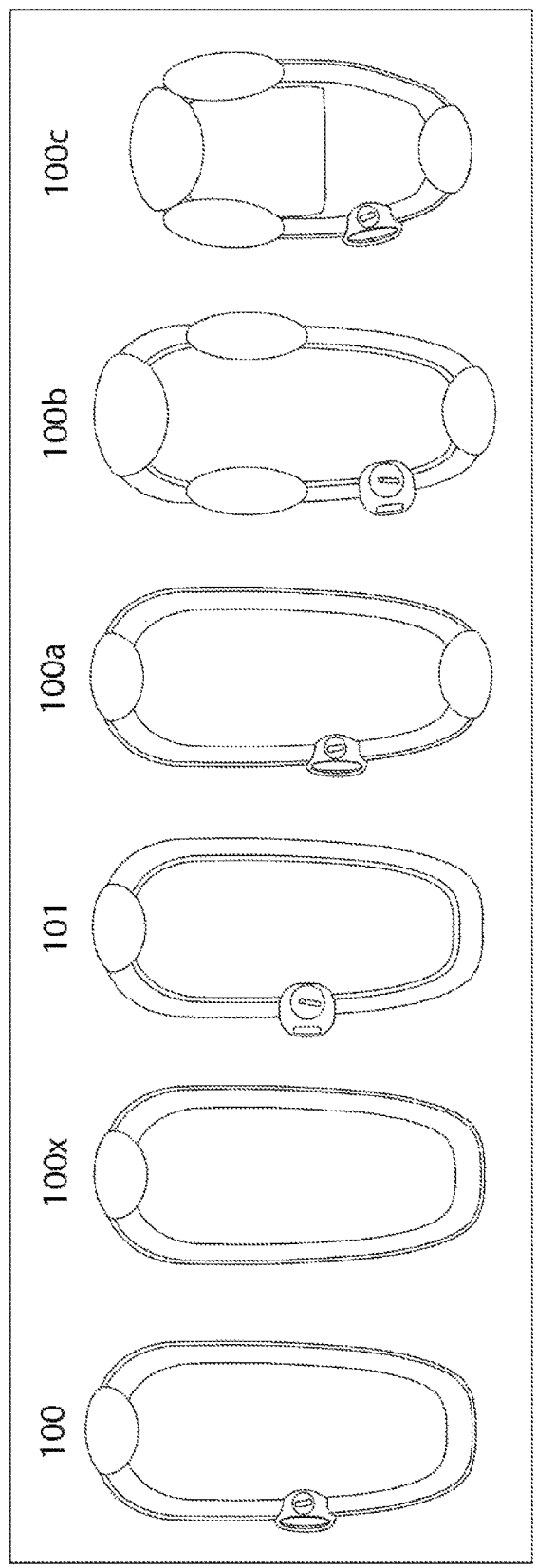
FIG. 11 is a plan view representing several variational embodiments and configurations of the present invention in the open states.

FIG. 11 represents several embodiments of the invention in its various forms and embodiments. Embodiment 100 is representative of the full features as disclosed in this document including an inflatable element beyond the perimeter spring coil of the unit, quick recoiling, quick inflation, and deflation features. Embodiment 100x is similar minus the housing and its included features but can include the other non-housing based features as disclosed and with the inflation member protruding beyond the perimeter coil spring frame of the device. Embodiment 101 represents the invention utilizing a spring which uncoils from the spool within the housing, the spring coil expands to the inner circumference of the inflation bladder. Embodiment 100a is similar to embodiment 100 with the addition of an inflated footrest which can be optionally removable as disclosed previously. Embodiment 101b is similar to embodiment 101, though shorter dimensionally as to be more chair like, with the additions of optionally removable armrests, footrest, and an enlarged back and headrest which all protrude beyond the perimeter spring. Embodiment 100c is similar to embodiment 100 as being fully featured with the additions of optionally removable large backrest, armrests, footrest, and a spanning cover acting like a seat pan with the remaining area open with the option to close it variably with a zipper, snaps or alternatively similar fastener.

Figure 12A:
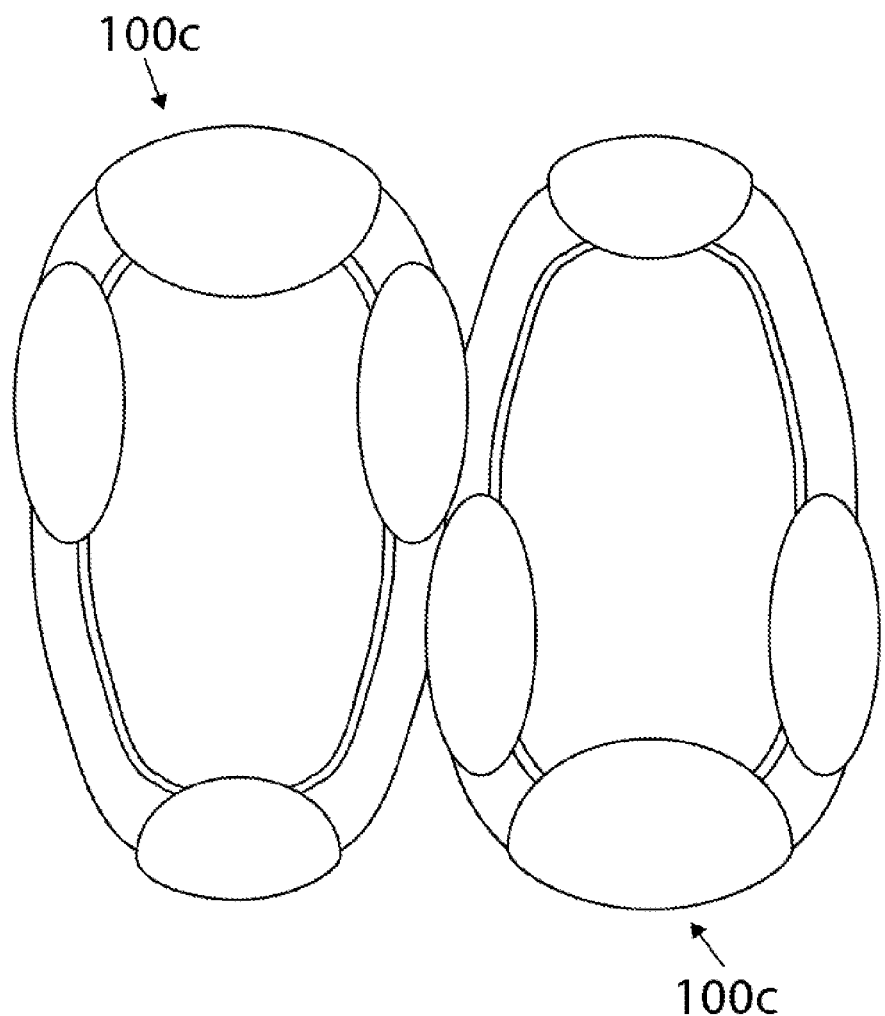
FIGS. 12a and 12b illustrate plans views of the present invention in various configurations interlinking.
Figure 12B:
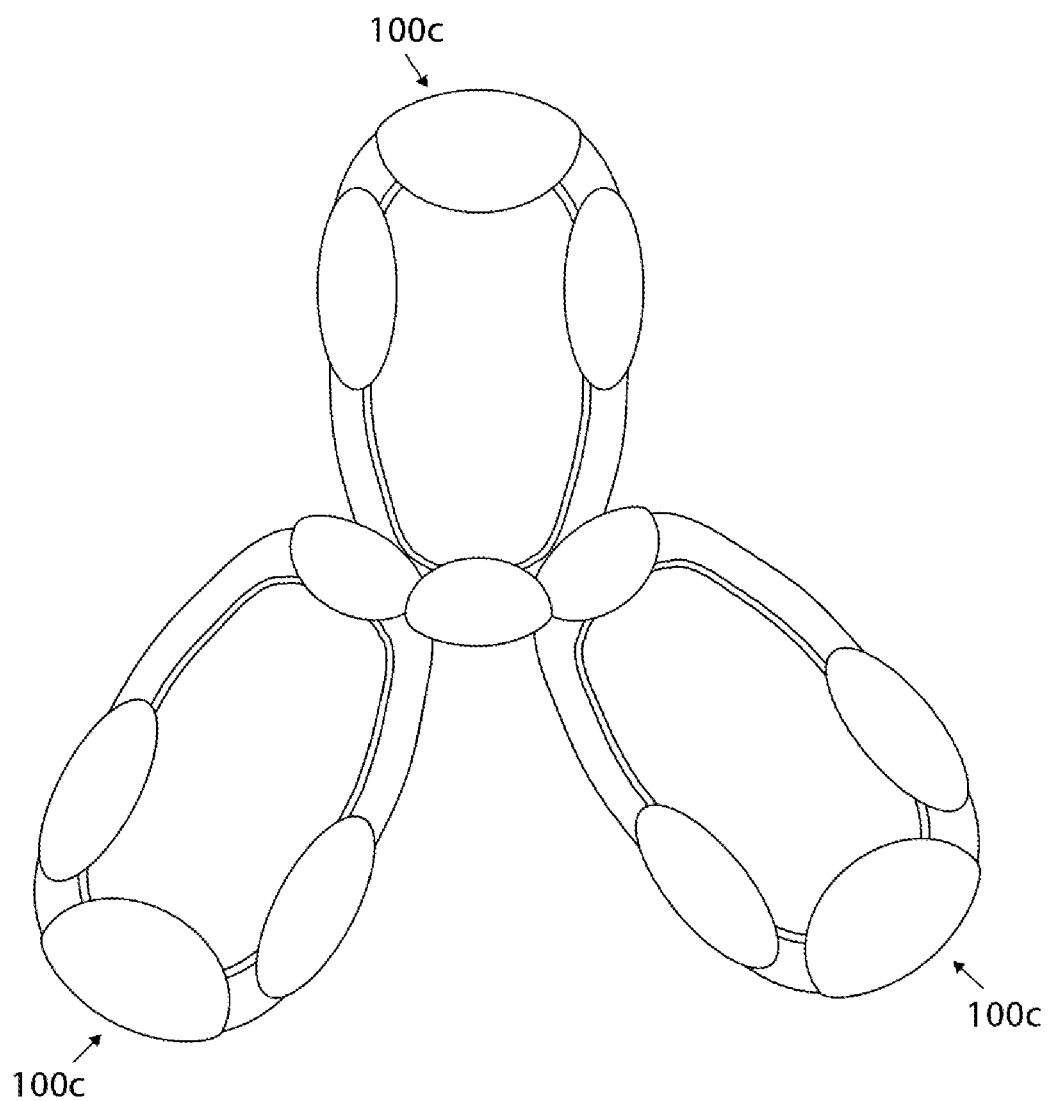

FIGS. 12a-12b plan views representing the disclosed invention in an embodiment 100c and its ability to interlink itself with other devices configured with the same linking elements as disclosed in this application. As stated, FIG. 12a illustrates two units of inflation device 100c alternately interlinked by way of the armrest inflation forms which unlike the prior art, protrude beyond the perimeter of the main body shape of the unit creating a more complex form which is conducive to interlinking by the placing the purposefully created higher elevated protruding form onto and over the lower elevation perimeter of the alternative unit creating a temporary interlinking of the two units (the elevating elements can be reversed in certain configurations to obtain the same feature intent). This interlinked form allows the participants to float together as one form and allows them to converse and socialized while recreating. FIG. 12b illustrates three units of inflation device 100c interlinked by way of the footrest inflation forms which protrude beyond the perimeter of the main body shape of the device allowing them to interlink in a similarly fashion as the protruding armrests. Identical inflation devices are not needed, any of the aforementioned device configuration with similar protruding elements per the inventive embodiments be it armrests, footrests or headrests, are designed purposefully as to interlink with each other easily and have protrusion details which allow for a more semi-permanent linkage if so desired by supplementing the temporary interlink by the use of a cord wrapped around the respective protruding elements.

Figure 13A:
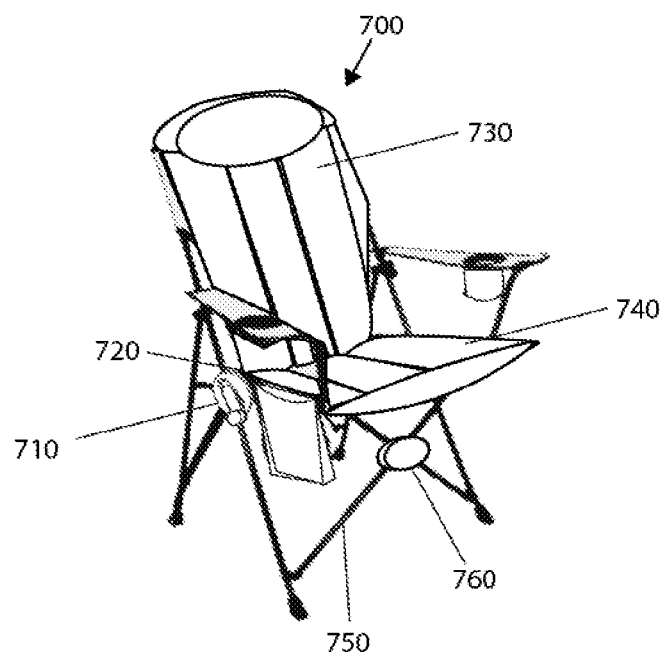
FIG. 13a illustrates a perspective view of another embodiment of the present invention in the embodiment of a portable recreational chair device.
Figure 13B:
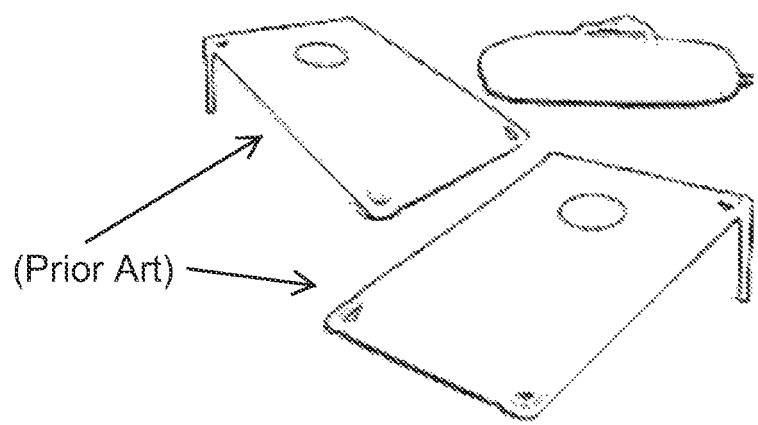
FIG. 13b illustrates a perspective view of the invention in a portable chair and a prior art portable recreational device or game that could benefit from the inventive features of the present invention.

FIG. 13a illustrates a front view of a portable recreation chair device 700 configured in accordance with an embodiment of the present invention. FIG. 13b is a portable recreation device or game which will benefit from the inventive features when applied to these types of devices. FIG. 13a is an illustration of a portable chair 700 which utilizes an expanding and contracting armature frame 750 which can be constructed from several metal tube elements preferably made of aluminum for its lightweight and waterproof properties. The expanding and contracting actions of the frame is controlled by plastic spool and handle housing assembly 710 which controls the reeling out when rotated in one direction and in, when rotated in the opposing direction of cable 720 which is threaded through the armature frame 750. The expansion spring, a biased torsion type in this embodiment as opposed to the coil spring in the previously disclosed configuration, is again of a plated high carbon content spring, configured to expand armature frame 750, is contained within plastic spring housing 760. When expanding the armature, the actuation pulls braided nylon cable 720 rotating the cable spool within, and therefore the expansion rate of the armature frame can be controlled by the operator's rotation of handle housing assembly 710. Inversely, when one wants to contract the chair back into its portable configuration, one merely releases the handle and rotates the handle as to rotate the spool in the direction as to reel in cable 720 creating a contracting force on armature frame 750 until the chair reaches its fully retracted form. Furthermore, lightweight portable chairs utilizing an armature frame are extremely uncomfortable due to the frame contracting over time causing the fabric seat and back to sag.

To remedy this known issue, an inflatable bladder seat back shape 730 and seat pan shape 740 can provide additional comfort due to the higher level of cushion, form and stability offered by the air bladder forms when fully inflated. Due to the expanded nature of an inflatable bladder which exerts expanding force outwards upon armature frame 750, acts to counter the force which typically causes the uncomfortable sagging exerted by one when sitting on or in the device. As previously disclosed, spool and handle housing assembly can utilize a fan blower mechanism and quick inflation and deflation valve assembly which can aid in the inflation and deflation of the seat back shape 730 and seat pan shape 740 within the crank or reel housing assembly 710 and as previously disclosed in this application on an alternative embodiment of an expanding frame device, the crank element can be configured to operate the fan mechanism further aiding in the rapid deployment and contracting features of the portable recreation chair device 700. Alternatively, a portable battery powered fan can be mated to the unit by way of a bayonet type connection which allows the valve to open and the pump to actuate by button press or automatically once connected. Additionally, accommodations for adding and incorporating expanding sunshade which would interface modularly with the deployment and retraction mechanism, as to be actuated along with the deployment and retracing of the chair device 700 as well as the utilization and special formed pockets for cooling gel packs for cooling items as well as one sitting in the chair are hereby disclosed as well as the capability to interlace the inflation elements creating multi-person sitting configurations for socialization.

Furthermore, If the inflation bladder shapes 730 and 740 are reconfigured to be larger and possibly in a slight reclined or variable position with the expanding armature frame 750 reconfigured to support that alternative configuration, this type of construction would allow the portable recreation chair device 700 to be used as a recreational floatation device and would be an alternative expanding frame construction to the previously disclosed configurations for portable and deployable recreational floatation devices.

FIG. 13*b* is an example of a current art portable recreation game which would benefit from the addition of the disclosed features, an expanding armature frame, an expansion spring such as a torsion spring and an interwoven cable which can be utilized to control the deployment from and the retraction back to its minimized portable configuration as disclosed in the previous embodiments of the disclosed invention. While specific embodiments have been shown and described to point out fundamental and novel features of the invention as applied in the preferred embodiments, it will be understood that various omissions and substitutions and changes of the form and details of the invention as disclosed and as illustrated and in the operation may be done by those skilled in the art, would still remain in the spirit of the invention as disclosed by this application.

The invention claimed is:

1. A foldable frame device, comprising:
 a flexible circular coil;
 a spool housing mounted to the flexible circular coil:
 a spool rotatably mounted within the spool housing:
 a handle mounted to the spool for manually rotating the spool;
 a first cord connected to both the spool and a first location on the flexible circular coil opposing the spool; and
 wherein rotating the handle in a first direction causes the cord to wind around the spool into the spool housing enacting the force required to fold the flexible circular coil over itself in a predetermined manner so as to reduce overall circumference of the flexible circular coil for ease of portability.

2. The foldable frame device of claim 1, wherein the spool has an axle with a small diameter and a larger diameter, wherein the first cord is attached to the small diameter and a second cord is attached to the larger diameter, and wherein rotating the handle of the spool winds and unwinds the first and second cords at difference rates.

3. The foldable frame device of claim 2, wherein the second cord is connected to both the larger diameter axle and a second location on the flexible circular coil opposing the spool.

4. The foldable frame device of claim 2, wherein the second cord is constructed of nylon.

5. The foldable frame device of claim 1, wherein the coil is constructed of metal.

6. The foldable frame device of claim 1, wherein the first cord is constructed of nylon.

7. The foldable frame device of claim 1, further comprising:
 an inflatable bladder partially entrapped by the spool housing assembly.

8. The foldable frame device of claim 7, wherein the spool housing contains a fan blade member configured to rotate with the handle so as to send pressurized air into the bladder.

9. A foldable frame device, comprising:
 a flexible circular coil;
 a spool housing mounted to the flexible circular coil:
 a first and second spool rotatably mounted within the spool housing:
 a handle mounted to the first and second spools for manually rotating the spools;
 a first cord connected to both the first spool and a first location on the flexible circular coil opposing the first spool;
 a second cord connected to both the second spool and a second location on the flexible circular coil opposing the second spool; and
 wherein rotating the handle in a first direction causes the first and second cords to wind around the first and second spools, respectively, into the spool housing enacting the force required to fold the flexible circular coil over itself in a predetermined manner so as to reduce overall circumference of the flexible circular coil for ease of portability.

10. The foldable frame device of claim 9, wherein the first spool has a small diameter and the second spool has a larger diameter, wherein the first cord is attached to the first spool and the second cord is attached to the second spool, and wherein rotating the handle winds and unwinds the first and second cords at difference rates.

11. The foldable frame device of claim 9, wherein the first cord is a first length and the second cord is a second length different from the first length.

12. A foldable frame device, comprising:
 a flexible circular coil;
 a spool housing mounted to the flexible circular coil:
 a spool rotatably mounted within the spool housing:
 a handle mounted to the spool for manually rotating the spool;
 a cord connected to both the spool and a location on the flexible circular coil opposing the spool; and
 wherein rotating the handle causes the cord to wind around the spool into the spool housing enacting the force required to fold the flexible circular coil over itself in a predetermined manner so as to reduce overall circumference of the flexible circular coil for ease of portability.

13. A foldable frame device, comprising:
 a spring frame structure;
 a spool housing mounted to the spring frame structure:
 a spool rotatably mounted within the spool housing:
 a handle mounted to the spool for manually rotating the spool;
 a cord connected to both the spool and a location on the spring frame structure; and
 wherein rotating the handle causes the cord to wind around the spool into the spool housing enacting a force that folds the spring frame structure in a predetermined manner so as to reduce overall volume for ease of portability.

* * * * *